United States Patent
Hall et al.

(10) Patent No.: US 11,124,035 B1
(45) Date of Patent: Sep. 21, 2021

(54) MULTI-STAGE ACTIVE SUSPENSION ACTUATOR

(71) Applicants: Jonathan L. Hall, Emerald Hills, CA (US); Troy A. Carter, Sunnyvale, CA (US); Paul J. Keas, San Jose, CA (US)

(72) Inventors: Jonathan L. Hall, Emerald Hills, CA (US); Troy A. Carter, Sunnyvale, CA (US); Paul J. Keas, San Jose, CA (US)

(73) Assignee: Apple Inc., Cupertino, CA (US)

( * ) Notice: Subject to any disclaimer, the term of this patent is extended or adjusted under 35 U.S.C. 154(b) by 50 days.

(21) Appl. No.: 16/115,603

(22) Filed: Aug. 29, 2018

Related U.S. Application Data

(60) Provisional application No. 62/562,626, filed on Sep. 25, 2017.

(51) Int. Cl.
  *B60G 17/04* (2006.01)
  *B60G 17/015* (2006.01)
  (Continued)

(52) U.S. Cl.
  CPC ....... *B60G 17/0152* (2013.01); *B60G 17/015* (2013.01); *B60G 17/016* (2013.01);
  (Continued)

(58) Field of Classification Search
  CPC .............. B60G 17/0152; B60G 17/015; B60G 17/0408; B60G 17/04; B60G 17/0165;
  (Continued)

(56) References Cited

U.S. PATENT DOCUMENTS

| 2,901,239 A | 8/1959 | Sethna |
| 3,236,334 A | 2/1966 | Wallerstein, Jr. |

(Continued)

FOREIGN PATENT DOCUMENTS

| CN | 108215946 A | 6/2018 |
| CN | 208439009 U | 1/2019 |

(Continued)

OTHER PUBLICATIONS

"Is it a fair fight? Hydraulics vs. electrics"; Josh Cosford; Mar. 26, 2014; https://www.mobilehydraulictips.com/fair-fight-hydraulics-vs-electrics/.*

(Continued)

*Primary Examiner* — Keith J Frisby
(74) *Attorney, Agent, or Firm* — Young Basile Hanlon & MacFarlane, P.C.

(57) ABSTRACT

A suspension actuator includes an upper mount, a lower mount, a first actuator mechanism, and a second actuator mechanism. The upper mount is connectable to a sprung mass of a vehicle. The lower mount is connectable to an unsprung mass of the vehicle. The first actuator mechanism forms a first load path between the upper mount and the lower mount. The first actuator mechanism is one of an electromagnetic linear actuator mechanism or a ball screw actuator mechanism. The second actuator mechanism forms a second load path in parallel with the first load path between the upper mount and the lower mount. The second actuator mechanism is one of a mechanical linear actuator mechanism, an air spring actuator mechanism, or a hydraulic actuator mechanism.

25 Claims, 19 Drawing Sheets

(51) Int. Cl.
   *B60G 17/016* (2006.01)
   *B60G 17/0165* (2006.01)
(52) U.S. Cl.
   CPC ......... *B60G 17/0157* (2013.01); *B60G 17/04* (2013.01); *B60G 17/0408* (2013.01); *B60G 17/0165* (2013.01); *B60G 2202/15* (2013.01); *B60G 2202/32* (2013.01); *B60G 2202/413* (2013.01); *B60G 2202/416* (2013.01); *B60G 2202/42* (2013.01); *B60G 2202/422* (2013.01); *B60G 2202/43* (2013.01); *B60G 2204/162* (2013.01); *B60G 2800/012* (2013.01)
(58) Field of Classification Search
   CPC .. B60G 17/0157; B60G 17/016; B60G 17/00; B60G 2202/32; B60G 2202/15; B60G 2202/422; B60G 2202/43; B60G 2202/413; B60G 2202/42; B60G 2202/416; B60G 2202/41; B60G 2800/012; B60G 2800/182; B60G 2204/62; B60N 2/501
   USPC ......... 280/5.507, 5.514, 5.515, 5.508, 5.513, 280/5.509, 5.5; 701/37, 38
   See application file for complete search history.

(56) References Cited

U.S. PATENT DOCUMENTS

| | | | |
|---|---|---|---|
| 3,322,379 A | 5/1967 | Flannelly |
| 3,368,824 A | 2/1968 | Julien |
| 3,441,238 A | 4/1969 | Flannelly |
| 3,781,032 A | 12/1973 | Jones |
| 3,970,162 A | 7/1976 | Le Salver et al. |
| 4,379,572 A | 4/1983 | Hedenberg |
| 4,530,514 A | 7/1985 | Ito |
| 4,537,420 A | 8/1985 | Ito et al. |
| 4,589,678 A | 5/1986 | Lund |
| 4,613,152 A | 9/1986 | Booher |
| 4,634,142 A | 1/1987 | Woods et al. |
| 4,637,628 A | 1/1987 | Perkins |
| 4,643,270 A | 2/1987 | Beer |
| 4,784,378 A | 11/1988 | Ford |
| 4,834,416 A | 5/1989 | Shimoe et al. |
| 4,893,832 A | 1/1990 | Booher |
| 4,922,159 A | 5/1990 | Phillips et al. |
| 4,960,290 A | 10/1990 | Bose |
| 4,981,309 A | 1/1991 | Froeschle et al. |
| 4,991,698 A | 2/1991 | Hanson |
| 5,033,028 A | 7/1991 | Browning |
| 5,060,959 A | 10/1991 | Davis et al. |
| 5,244,053 A | 9/1993 | Kashiwagi |
| 5,364,081 A | 11/1994 | Hartl |
| 5,401,053 A | 3/1995 | Sahm et al. |
| 5,409,254 A | 4/1995 | Minor et al. |
| 5,468,055 A | 11/1995 | Simon et al. |
| 5,507,518 A | 4/1996 | Nakahara et al. |
| 5,517,414 A | 5/1996 | Hrovat |
| 5,645,250 A | 7/1997 | Gevers |
| 5,678,847 A | 10/1997 | Izawa et al. |
| 5,785,345 A | 7/1998 | Barlas et al. |
| 5,810,335 A | 9/1998 | Wirtz et al. |
| 5,829,764 A | 11/1998 | Griffiths |
| 5,880,542 A | 3/1999 | Leary et al. |
| 6,032,770 A | 3/2000 | Alcone et al. |
| 6,113,119 A | 9/2000 | Laurent et al. |
| 6,170,838 B1 | 1/2001 | Laurent et al. |
| 6,233,510 B1 | 5/2001 | Platner et al. |
| 6,249,728 B1 | 6/2001 | Streiter |
| 6,276,710 B1 | 8/2001 | Sutton |
| 6,314,353 B1 | 11/2001 | Ohsaku et al. |
| 6,357,770 B1 | 3/2002 | Carpiaux et al. |
| 6,364,078 B1 | 4/2002 | Parison et al. |
| 6,443,436 B1 | 9/2002 | Schel |
| 6,470,248 B2 | 10/2002 | Shank et al. |
| 6,502,837 B1 | 1/2003 | Hamilton et al. |
| 6,634,445 B2 | 10/2003 | Dix et al. |
| 6,637,561 B1 | 10/2003 | Collins et al. |
| 6,873,891 B2 | 3/2005 | Moser et al. |
| 6,926,288 B2 | 8/2005 | Bender |
| 6,940,248 B2 | 9/2005 | Maresca et al. |
| 6,945,541 B2 | 9/2005 | Brown |
| 7,017,690 B2 | 3/2006 | Burke |
| 7,032,723 B2 | 4/2006 | Quaglia et al. |
| 7,051,851 B2 | 5/2006 | Svartz et al. |
| 7,140,601 B2 | 11/2006 | Nesbitt et al. |
| 7,195,250 B2 | 3/2007 | Knox et al. |
| 7,202,577 B2 | 4/2007 | Parison et al. |
| 7,302,825 B2 | 12/2007 | Knox |
| 7,308,351 B2 | 12/2007 | Knoop et al. |
| 7,392,997 B2 | 7/2008 | Sanville et al. |
| 7,401,794 B2 | 7/2008 | Laurent et al. |
| 7,421,954 B2 | 9/2008 | Bose |
| 7,427,072 B2 | 9/2008 | Brown |
| 7,484,744 B2 | 2/2009 | Galazin et al. |
| 7,502,589 B2 | 3/2009 | Howard et al. |
| 7,543,825 B2 | 6/2009 | Yamada |
| 7,551,749 B2 | 6/2009 | Rosen et al. |
| 7,641,010 B2 | 1/2010 | Mizutani et al. |
| 7,644,938 B2 | 1/2010 | Yamada |
| 7,654,540 B2 | 2/2010 | Parison et al. |
| 7,818,109 B2 | 10/2010 | Scully |
| 7,823,891 B2 | 11/2010 | Bushko et al. |
| 7,932,684 B2 | 4/2011 | O'Day et al. |
| 7,962,261 B2 | 6/2011 | Bushko et al. |
| 7,963,529 B2 | 6/2011 | Oteman et al. |
| 7,976,038 B2 | 7/2011 | Gregg |
| 8,047,551 B2 | 11/2011 | Morris et al. |
| 8,067,863 B2 | 11/2011 | Giovanardi |
| 8,095,268 B2 | 1/2012 | Parison et al. |
| 8,099,213 B2 | 1/2012 | Zhang et al. |
| 8,109,371 B2 | 2/2012 | Kondo et al. |
| 8,112,198 B2 | 2/2012 | Parison, Jr. et al. |
| 8,113,522 B2 | 2/2012 | Oteman et al. |
| 8,127,900 B2 | 3/2012 | Inoue |
| 8,157,036 B2 | 4/2012 | Yogo et al. |
| 8,191,874 B2 | 6/2012 | Inoue et al. |
| 8,282,149 B2 | 10/2012 | Kniffin et al. |
| 8,336,319 B2 | 12/2012 | Johnston et al. |
| 8,356,861 B2 | 1/2013 | Kniffin et al. |
| 8,360,387 B2 | 1/2013 | Breen et al. |
| 8,370,022 B2 | 2/2013 | Inoue et al. |
| 8,387,762 B2 | 3/2013 | Kondo et al. |
| 8,417,417 B2 | 4/2013 | Chen et al. |
| 8,428,305 B2 | 4/2013 | Zhang et al. |
| 8,466,639 B2 | 6/2013 | Parison, Jr. et al. |
| 8,490,761 B2 | 7/2013 | Kondo |
| 8,499,903 B2 | 8/2013 | Sakuta et al. |
| 8,548,678 B2 | 10/2013 | Ummethala et al. |
| 8,579,311 B2 | 11/2013 | Butlin, Jr. et al. |
| 8,641,052 B2 | 2/2014 | Kondo et al. |
| 8,641,053 B2 | 2/2014 | Pare et al. |
| 8,668,060 B2 | 3/2014 | Kondo et al. |
| 8,682,530 B2 | 3/2014 | Nakamura |
| 8,701,845 B2 | 4/2014 | Kondo |
| 8,725,351 B1 | 5/2014 | Selden et al. |
| 8,744,680 B2 | 6/2014 | Rieger et al. |
| 8,744,694 B2 | 6/2014 | Ystueta |
| 8,757,309 B2 | 6/2014 | Schmitt et al. |
| 8,783,430 B2 | 7/2014 | Brown |
| 8,890,461 B2 | 11/2014 | Knox et al. |
| 8,930,074 B1 | 1/2015 | Lin |
| 8,938,333 B2 | 1/2015 | Bose et al. |
| 9,062,983 B2 | 6/2015 | Zych |
| 9,079,473 B2 | 7/2015 | Lee et al. |
| 9,102,209 B2 | 8/2015 | Giovanardi et al. |
| 9,291,300 B2 | 3/2016 | Parker et al. |
| 9,316,667 B2 | 4/2016 | Ummethala et al. |
| 9,349,304 B2 | 5/2016 | Sangermano, II et al. |
| 9,399,384 B2 | 7/2016 | Lee et al. |
| 9,533,539 B2 | 1/2017 | Eng et al. |
| 9,550,495 B2 | 1/2017 | Tatourian et al. |
| 9,625,902 B2 | 4/2017 | Knox |
| 9,643,467 B2 | 5/2017 | Selden et al. |

(56) References Cited

U.S. PATENT DOCUMENTS

| | | |
|---|---|---|
| 9,702,349 B2 | 7/2017 | Anderson et al. |
| 9,855,887 B1 | 1/2018 | Potter et al. |
| 9,868,332 B2 | 1/2018 | Anderson et al. |
| 9,975,391 B2 | 5/2018 | Tseng et al. |
| 10,065,474 B2 | 9/2018 | Trangbaek |
| 10,093,145 B1 | 10/2018 | Vaughan et al. |
| 10,245,984 B2 | 4/2019 | Parker et al. |
| 10,300,760 B1 | 5/2019 | Aikin et al. |
| 10,315,481 B2 | 6/2019 | Lu et al. |
| 10,377,371 B2 | 8/2019 | Anderson et al. |
| 10,513,161 B2 | 12/2019 | Anderson et al. |
| 2001/0045719 A1 | 11/2001 | Smith |
| 2003/0030241 A1 | 2/2003 | Lawson |
| 2004/0074720 A1 | 4/2004 | Thieltges |
| 2004/0094912 A1 | 5/2004 | Niwa et al. |
| 2004/0226788 A1 | 11/2004 | Tanner |
| 2004/0245732 A1 | 12/2004 | Kotulla et al. |
| 2005/0051986 A1 | 3/2005 | Galazin et al. |
| 2005/0096171 A1 | 5/2005 | Brown et al. |
| 2005/0199457 A1 | 9/2005 | Beck |
| 2005/0206231 A1 | 9/2005 | Lu et al. |
| 2005/0247496 A1 | 11/2005 | Nagaya |
| 2006/0043804 A1 | 3/2006 | Kondou |
| 2006/0076828 A1 | 4/2006 | Lu et al. |
| 2006/0119064 A1 | 6/2006 | Mizuno et al. |
| 2006/0181034 A1 | 8/2006 | Wilde et al. |
| 2006/0266599 A1 | 11/2006 | Denys et al. |
| 2006/0273530 A1 | 12/2006 | Zuber |
| 2007/0069496 A1 | 3/2007 | Rinehart et al. |
| 2007/0107959 A1 | 5/2007 | Suzuki et al. |
| 2007/0114706 A1 | 5/2007 | Myers |
| 2007/0199750 A1 | 8/2007 | Suzuki et al. |
| 2007/0210539 A1 | 9/2007 | Hakui et al. |
| 2008/0017462 A1 | 1/2008 | Mizutani et al. |
| 2008/0100020 A1 | 5/2008 | Gashi et al. |
| 2008/0164111 A1 | 7/2008 | Inoue et al. |
| 2008/0185807 A1 | 8/2008 | Takenaka |
| 2008/0283315 A1 | 11/2008 | Suzuki et al. |
| 2009/0033055 A1 | 2/2009 | Morris et al. |
| 2009/0064808 A1 | 3/2009 | Parison et al. |
| 2009/0095584 A1 | 4/2009 | Kondo et al. |
| 2009/0120745 A1 | 5/2009 | Kondo et al. |
| 2009/0121398 A1 | 5/2009 | Inoue |
| 2009/0173585 A1 | 7/2009 | Kappagantu |
| 2009/0174158 A1 | 7/2009 | Anderson et al. |
| 2009/0198419 A1 | 8/2009 | Clark |
| 2009/0218867 A1 | 9/2009 | Clark |
| 2009/0243402 A1 | 10/2009 | O'Day et al. |
| 2009/0243598 A1 | 10/2009 | O'Day |
| 2009/0273147 A1 | 11/2009 | Inoue et al. |
| 2009/0286910 A1 | 11/2009 | Bloomfield |
| 2009/0302559 A1 | 12/2009 | Doerfel |
| 2009/0321201 A1 | 12/2009 | Sakuta et al. |
| 2010/0044977 A1 | 2/2010 | Hughes et al. |
| 2010/0059959 A1 | 3/2010 | Kim |
| 2010/0207344 A1 | 8/2010 | Nakamura |
| 2010/0222960 A1 | 9/2010 | Oida et al. |
| 2010/0252376 A1 | 10/2010 | Chern et al. |
| 2011/0115183 A1 | 5/2011 | Alesso et al. |
| 2012/0059547 A1 | 3/2012 | Chen et al. |
| 2012/0109483 A1 | 5/2012 | O'Dea et al. |
| 2012/0153718 A1 | 6/2012 | Rawlinson et al. |
| 2012/0181757 A1 | 7/2012 | Oteman et al. |
| 2012/0187640 A1 | 7/2012 | Kondo et al. |
| 2012/0193847 A1 | 8/2012 | Muragishi et al. |
| 2012/0305348 A1 | 12/2012 | Katayama et al. |
| 2012/0306170 A1 | 12/2012 | Serbu et al. |
| 2013/0060422 A1 | 3/2013 | Ogawa et al. |
| 2013/0060423 A1 | 3/2013 | Jolly |
| 2013/0106074 A1 | 5/2013 | Koku et al. |
| 2013/0221625 A1 | 8/2013 | Pare et al. |
| 2013/0229074 A1 | 9/2013 | Haferman et al. |
| 2013/0233632 A1 | 9/2013 | Kim et al. |
| 2013/0253764 A1 | 9/2013 | Kikuchi et al. |
| 2013/0341143 A1 | 12/2013 | Brown |
| 2014/0005888 A1 | 1/2014 | Bose et al. |
| 2014/0145498 A1 | 5/2014 | Yamakado et al. |
| 2014/0156143 A1 | 6/2014 | Evangelou et al. |
| 2014/0260233 A1 | 9/2014 | Giovanardi et al. |
| 2014/0312580 A1 | 10/2014 | Gale |
| 2014/0358378 A1 | 12/2014 | Howard et al. |
| 2015/0123370 A1 | 5/2015 | Lee et al. |
| 2015/0197130 A1 | 7/2015 | Smith et al. |
| 2015/0224845 A1 | 8/2015 | Anderson et al. |
| 2015/0231942 A1 | 8/2015 | Trangbaek et al. |
| 2016/0059658 A1 | 3/2016 | Kuriki |
| 2016/0096458 A1 | 4/2016 | Parker et al. |
| 2016/0159187 A1 | 6/2016 | Mohamed |
| 2016/0167743 A1 | 6/2016 | Melcher |
| 2016/0291574 A1 | 10/2016 | Parison |
| 2016/0339823 A1 | 11/2016 | Smith et al. |
| 2016/0347143 A1 | 12/2016 | Hrovat et al. |
| 2017/0047823 A1 | 2/2017 | Sangermano, III et al. |
| 2017/0100980 A1 | 4/2017 | Tsuda |
| 2017/0129367 A1 | 5/2017 | Hein |
| 2017/0129371 A1 | 5/2017 | Knox |
| 2017/0129372 A1 | 5/2017 | Hein et al. |
| 2017/0129373 A1 | 5/2017 | Knox et al. |
| 2017/0137023 A1 | 5/2017 | Anderson et al. |
| 2017/0144501 A1 | 5/2017 | Wall |
| 2017/0203673 A1 | 7/2017 | Parker et al. |
| 2017/0240018 A1 | 8/2017 | Mettrick et al. |
| 2017/0241504 A1 | 8/2017 | Delorenzis et al. |
| 2017/0253101 A1 | 9/2017 | Kuriki |
| 2017/0253155 A1 | 9/2017 | Knox et al. |
| 2018/0015801 A1 | 1/2018 | Mohamed et al. |
| 2018/0022178 A1 | 1/2018 | Xi |
| 2018/0029585 A1 | 2/2018 | Tanimoto |
| 2018/0079272 A1 | 3/2018 | Aikin |
| 2018/0089901 A1 | 3/2018 | Rober et al. |
| 2018/0105082 A1 | 4/2018 | Knox |
| 2018/0126816 A1 | 5/2018 | Kondo et al. |
| 2018/0134111 A1 | 5/2018 | Toyohira et al. |
| 2018/0162186 A1 | 6/2018 | Anderson et al. |
| 2018/0162187 A1 | 6/2018 | Trangbaek |
| 2018/0222274 A1 | 8/2018 | Davis et al. |
| 2018/0297587 A1 | 10/2018 | Kasaiezadeh Mahabadi et al. |
| 2018/0345747 A1* | 12/2018 | Boon ............... B60G 17/056 |
| 2019/0023094 A1 | 1/2019 | Panagis et al. |
| 2019/0118604 A1 | 4/2019 | Suplin et al. |
| 2019/0248203 A1 | 8/2019 | Krehmer et al. |
| 2019/0308484 A1* | 10/2019 | Belter ............ B60G 17/0408 |
| 2020/0088214 A1* | 3/2020 | Woodard ........ B60G 17/0165 |
| 2020/0171907 A1 | 6/2020 | Hall et al. |
| 2020/0216128 A1 | 7/2020 | Doerksen |

FOREIGN PATENT DOCUMENTS

| | | |
|---|---|---|
| DE | 102009060213 A1 | 6/2011 |
| DE | 202012002846 U1 | 7/2012 |
| DE | 102015003530 A1 | 9/2016 |
| DE | 102016000686 A1 | 7/2017 |
| DE | 102018208774 A1 | 12/2019 |
| EP | 2072855 A1 | 6/2009 |
| EP | 2233330 B1 | 2/2013 |
| EP | 3088230 A1 | 11/2016 |
| GB | 2437633 A | 10/2007 |
| JP | 2006200734 A | 8/2006 |
| JP | 2012002300 A | 1/2012 |
| JP | 2012167757 A | 9/2012 |
| JP | 2013244841 A | 12/2013 |
| JP | 5796315 B2 | 10/2015 |
| KR | 101509600 B1 | 4/2015 |
| WO | 9304883 A1 | 3/1993 |
| WO | 2012028228 A2 | 3/2012 |
| WO | 2014004118 A1 | 1/2014 |
| WO | 2014004119 A1 | 1/2014 |
| WO | 2014094934 A1 | 6/2014 |
| WO | 2015153811 A1 | 10/2015 |
| WO | 2015169530 A1 | 11/2015 |

(56) References Cited

FOREIGN PATENT DOCUMENTS

| | | |
|---|---|---|
| WO | 2016120044 A1 | 8/2016 |
| WO | 2017055151 A1 | 4/2017 |

OTHER PUBLICATIONS daimler.com, "Suspension: The world's first suspension system with 'eyes'", https://media.daimler.com/marsMediaSite/en/instance/ko/Suspension-The-worlds-first-suspension-system-with-eyes.xhtml?oid=9904306, May 15, 2013 (6 pp).

youtube.com., KSSofficial, "Miniature Ball Screw With Ball Spline / English", Published on May 10, 2013, https://www.youtube.com/watch?v=vkcxmM0iC8U (2 pp).

Nippon Bearing, "Ball Screw Spline SPBR/SPBF", Product Description, Date Unknown, Downloaded Jun. 28, 2019, https://www.nbcorporation.com/shop/ball-spline/spbr-spbf/ (2 pp).).

Monroe Intelligent Suspension, "CVSA2/KINETIC: Low Energy for High Performance", www.monroeintelligentsuspension.com/products/cvsa2-kinetic/, Date Unknown, Downloaded Mar. 2, 2017, 2 pp.

TENNECO, "Integrated Kinetic, H2 CES System, Ride Control Innovation, Accelerated", Rev. Sep. 2011, 4 pp.

porsche.com, "Porsche AG: Porsche 918 RSR—Racing Laboratory With Even Higher-Performance Hybrid Drive—Porsche USA", Current Press Releases dated Jan. 10, 2011, Downloaded Mar. 13, 2017, www.porsche.com/usa/aboutporsche/pressreleases/pag/?pool=international-de&id-2011-01-10, 6 pp.

autoblog.com, "Porsche (finally) Unleashes Full, Official Details in 918 Spyder—Autoblog", Sep. 9, 2013, www.autoblog.com/2013/09/09/porsche-official-detials-918-spyder-frankfurt/, Downloaded Mar. 13, 2017, 26 pp.

press.porsche.com, "Introducing the Porsche 918 Spyder", Date Unknown, http://press.porsche.com/news/release.php?id-787, Downloaded Mar. 13, 2017, 7 pp.

Edren, Johannes, "Motion Modelling and Control Strategies of Over-Actuated Vehicles", Doctoral Thesis, Stockholm 2014 (56 pp).

Bolognesi, P., et al., "FEM Modeling and Analysis of a Novel Rotary-Linear Isotropic Brushless Machine", XIX International Conference of Electrical Machines—ICEM 2010, Rome (6 pp).

Xu, Lei, et. al., "Design and Analysis of a Double-Stator Linear-Rotary Permanent-Magnet Motor", IEEE Transactions on Applied Superconductivity, vol. 26, No. 4, Jun. 2016, (4 pp).

SAE International, "Michelin re-invents the wheel", Oct. 14, 2008, Downloaded Sep. 7, 2017, http://articles.sae.org/4604/ (2 pp).

Wikipedia, "Trailing-arm suspension", https://en.wikipedia.org/wiki/Trailing-arm_suspension, downloaded Sep. 3, 2019 (2 pp).

\* cited by examiner

MULTI-STAGE ACTIVE SUSPENSION ACTUATOR

CROSS-REFERENCE TO RELATED APPLICATION(S)

This application claims priority to and the benefit of U.S. Provisional Patent Application No. 62/562,626, filed Sep. 25, 2017, the entire disclosure of which is incorporated by reference herein.

TECHNICAL FIELD

The present disclosure relates to suspension systems for vehicles and, in particular, active suspension actuators and suspension systems with active suspension actuators.

BACKGROUND

Conventional vehicle suspension systems are passive systems having a spring and a damper that transfer and damp forces between the sprung mass (e.g., vehicle body) and the unsprung mass (e.g., tires, wheels, brakes, etc.). Handling characteristics of the vehicle and passenger comfort may be improved with an active suspension system that selectively controls force transfer to the vehicle body.

SUMMARY

Disclosed herein are implementations of active suspension systems and suspension actuators. In one implementation, a suspension actuator includes an upper mount, a lower mount, a first actuator, and a second actuator. The upper mount is connectable to a sprung mass of a vehicle. The lower mount is connectable to an unsprung mass of the vehicle. The first actuator forms a first load path between the upper mount and the lower mount. The first actuator is one of an electromagnetic linear actuator or a ball screw actuator. The second actuator forms a second load path in parallel with the first load path between the upper mount and the lower mount. The second actuator is one of a mechanical linear actuator, an air spring actuator, or a hydraulic actuator.

In another implementation, a suspension actuator includes a first mount, a second mount, a primary actuator, and a second actuator. The first mount is for connecting to a sprung mass of a vehicle. The second mount is for connecting to an unsprung mass of the vehicle. The primary actuator selectively applies force between the first mount and the second mount. The second actuator selectively applies force between the first mount and the second mount in parallel to the primary actuator. The second actuator requires less power to produce an output force than the primary actuator.

A suspension system for a vehicle includes four suspension actuators and a fluid circuit. Each suspension actuator is configured to selectively apply force between a sprung mass of a vehicle and one of four unsprung masses of the vehicle. Each suspension actuator includes a primary actuator and a hydraulic actuator mechanism. The primary actuators are for selectively applying force between the sprung mass and one of the unsprung masses. The hydraulic actuator mechanism is for selectively applying force between the sprung mass and the one of the unsprung masses in parallel with the primary actuator. The fluid circuit includes a pump in fluidic communication with the hydraulic actuator mechanism of two of the suspension actuators to control displacement thereof.

DETAILED DESCRIPTION

Figure 1:
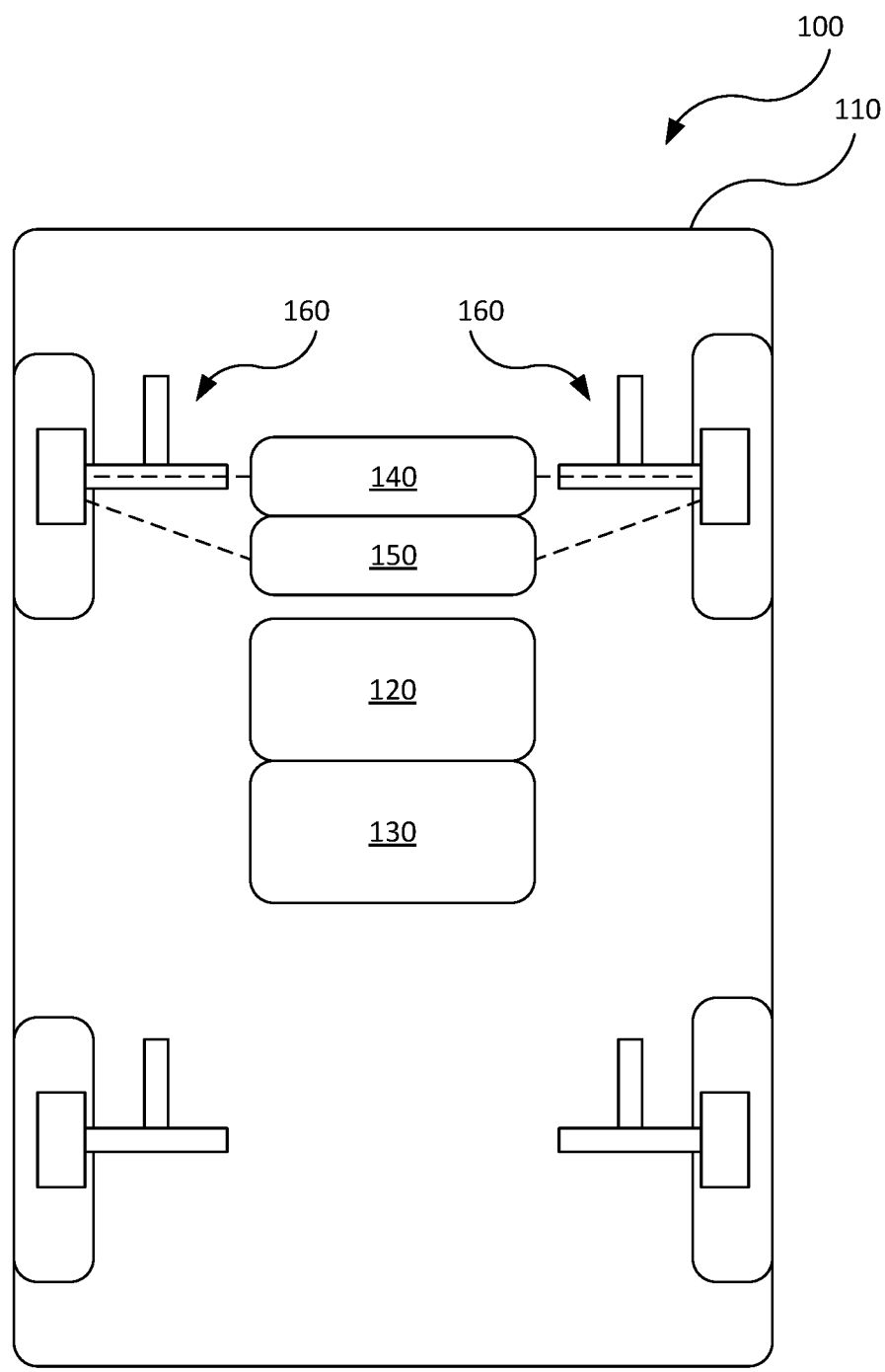
FIG. 1 is a schematic view of a vehicle.

Referring to FIG. 1, a vehicle 100 generally includes a vehicle body 110, a control system 120, an energy storage system 130, a drive system 140, a steering system 150, and a suspension system 160. The drive system 140, the steering system 150, and the suspension system 160 are connected to the vehicle body 110 to, respectively, propel, steer, and support the vehicle 100 on a road surface. The control system 120 controls operation of the energy storage system 130, the drive system 140, the steering system 150, and the suspension system 160. The energy storage system 130 provides electrical power to the control system 120, the drive system 140, the steering system 150, and the suspension system 160 for operation thereof.

Figure 2:
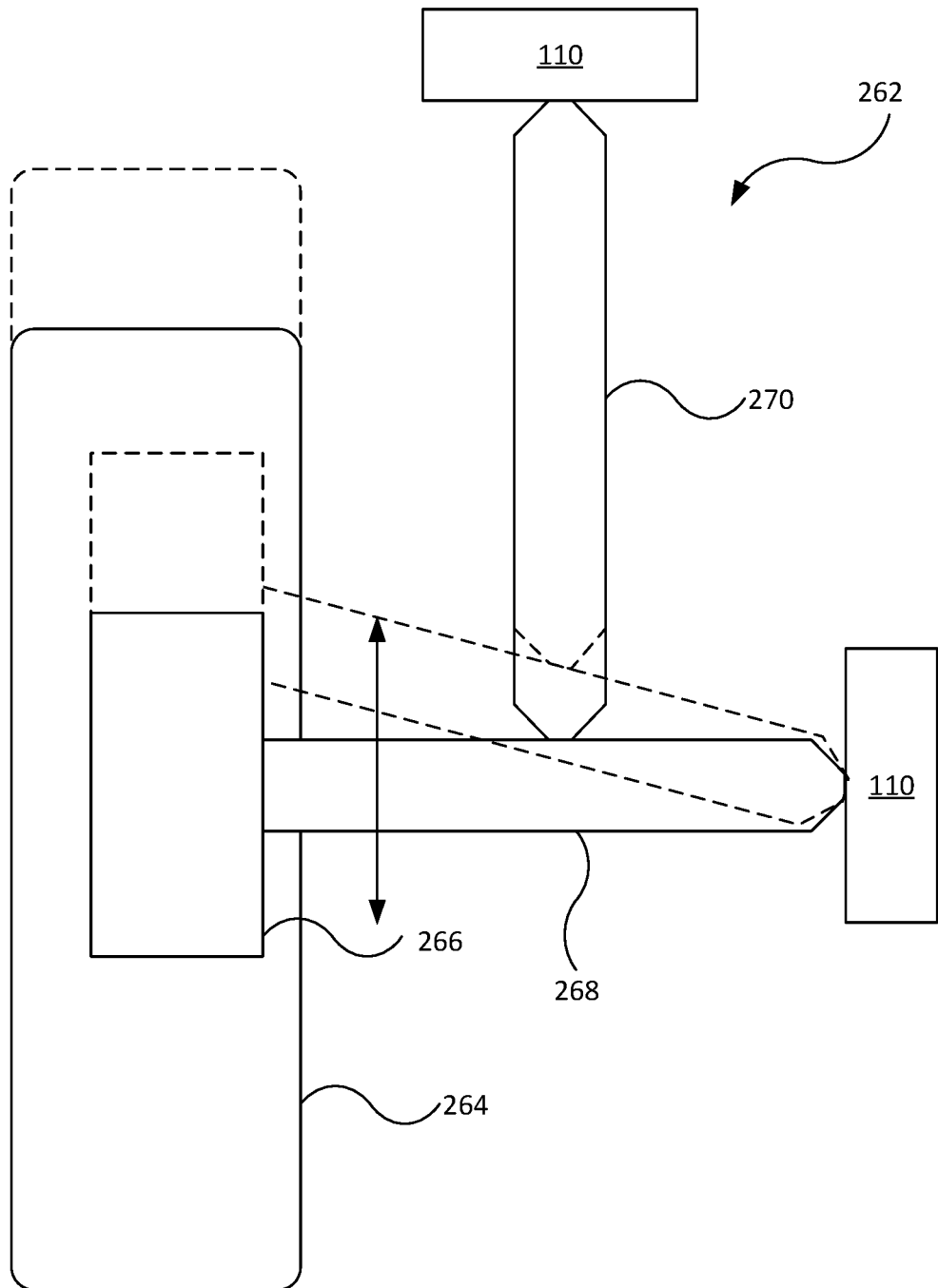
FIG. 2 is a view of a suspension assembly of the vehicle in FIG. 1.

Referring to FIG. 2, the suspension system 160 is generally configured to maintain contact with the road surface and to control movement of the vehicle body 110 as the vehicle 100 travels over disturbances in the road. The suspension system 160 includes one or more suspension assemblies 262, for example, one at each corner of the vehicle 100 (e.g., front left, front right, rear right, and rear left) to support the vehicle 100 on the road surface.

Each suspension assembly 262 generally includes a tire and wheel assembly 264, a steering knuckle 266, a suspension arm 268, and a suspension actuator 270. The tire and wheel assembly 264 and, specifically a tire thereof, contacts the road surface. The tire and wheel assembly 264 is rotatably coupled to the steering knuckle 266, which is in turn pivotably coupled to the suspension arm 268. The suspension arm 268 extends inboard the steering knuckle 266 to be pivotably coupled to the vehicle body 110, thereby allowing the tire and wheel assembly 264 to move vertically relative to the vehicle body 110. The suspension actuator 270 is coupled to and extends between the vehicle body 110 and the suspension arm 268 to control the vertical movement between the tire and wheel assembly 264 and the vehicle body 110. The tire and wheel assembly 264, the steering knuckle 266, and the suspension arm 268 may be considered part of an unsprung mass, while the vehicle body 110 forms a sprung mass. On a vehicle having four wheels, the vehicle may be considered to have four unsprung masses.

The suspension actuator 270 is actively operable to control movement of the unsprung mass relative to the sprung mass, including both to cause and resist movement of the suspension arm 268 relative to the vehicle body 110. More particularly, referring to the schematic view of FIG. 3, the suspension actuator 270 includes multiple actuator mechanisms, which act in parallel to each other to apply force (e.g., selectively or controllably) between the sprung mass 310 (e.g., the vehicle body) and the unsprung mass 360 (e.g., the suspension arm 268, among other components). By acting in parallel, the total force applied by the suspension actuator 270 between the sprung mass 310 and the unsprung mass 360 is the sum of the forces applied by the actuator mechanisms. The suspension actuator 270, by including multiple actuator mechanisms, may be referred to as a multi-element actuator, a multi-stage suspension actuator, or a suspension actuator assembly (or actuator assembly). Furthermore, the various actuator mechanisms discussed herein may be referred to as actuators.

Figure 3A:
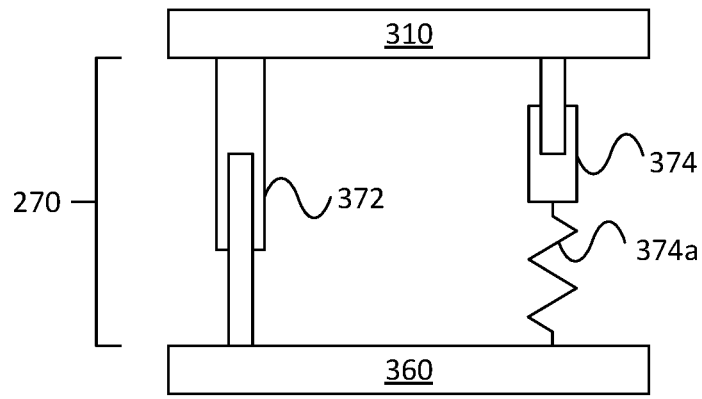
FIG. 3A is a schematic view of an embodiment of a suspension actuator for use in the suspension assembly of FIG. 1.
Figure 3B:
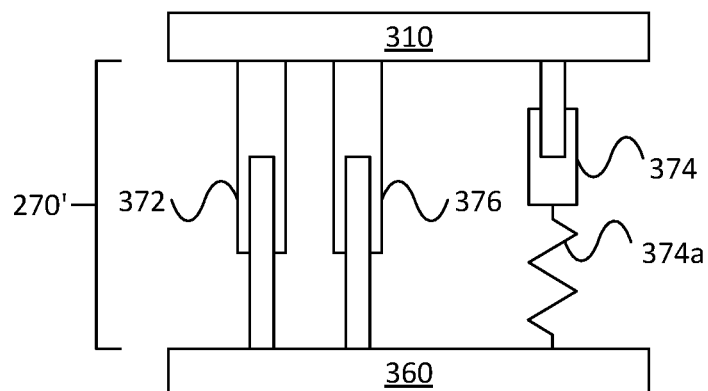
FIG. 3B is a schematic view of another embodiment of a suspension actuator for use in the suspension assembly of FIG. 1.
Figure 3C:
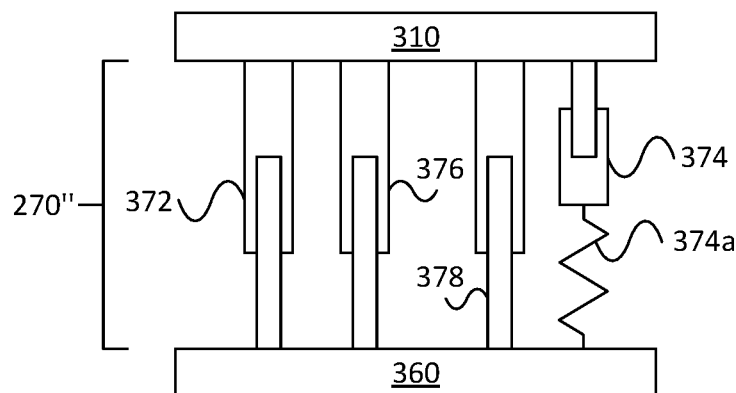
FIG. 3C is a schematic view of another embodiment of a suspension actuator for use in the suspension assembly of FIG. 1.
Figure 4:
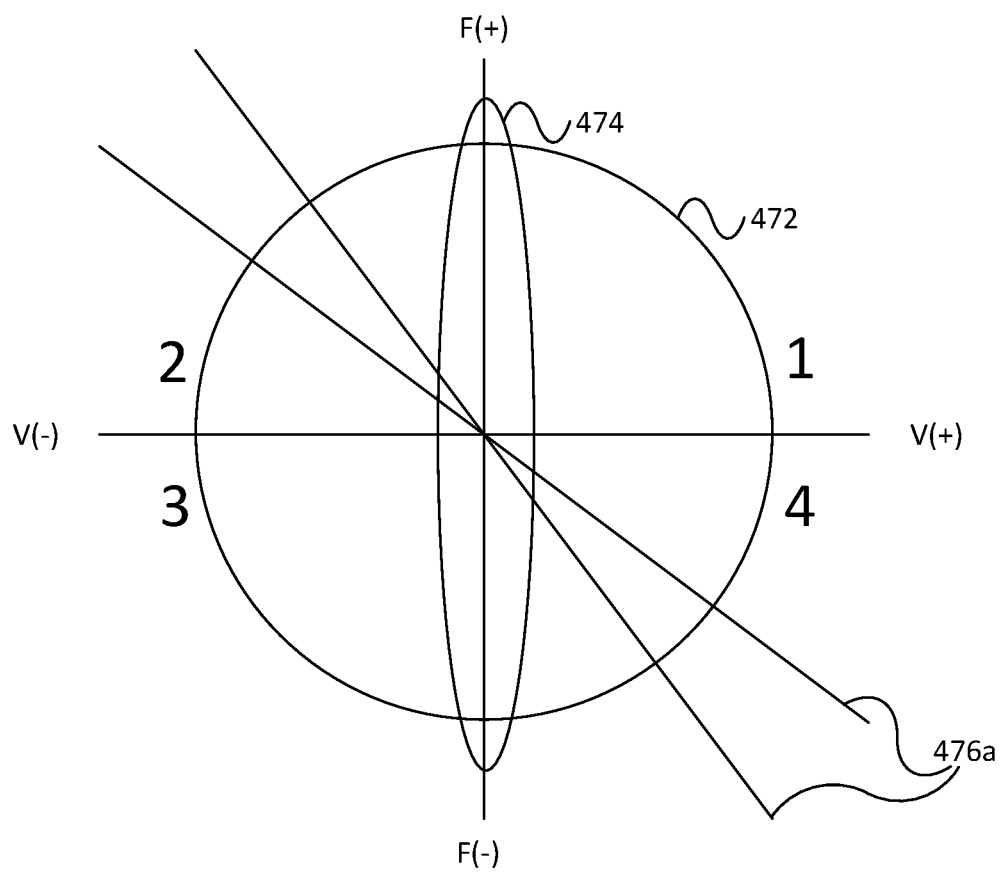
FIG. 4 is a plot of force vs. velocity illustrating operating envelopes of actuator mechanisms for use in the suspension actuators of FIGS. 3A-3C.

Referring to the schematic views of FIGS. 3A-3C, the multiple actuation mechanisms of the suspension actuator 270 act in parallel between the vehicle body 110 and the suspension arm 268. The suspension actuator 270 may include different numbers of actuation mechanisms, which may have different properties and be of different types. The suspension actuator 270 includes two actuator mechanisms, including a first actuation mechanism 372 and a second actuation mechanism 374, while an alternative suspension actuator 270' additionally includes a third actuation mechanism 376, and a still further alternative suspension actuator 270" includes a still further fourth actuation mechanism 378. The different properties of the actuation mechanisms may include force vs. velocity characteristics, mechanical advantage, force hold energy consumption, and energy regeneration capability. Force vs. velocity characteristics refer to the force output capacity for velocity (positive and negative) between ends of the actuator mechanism. Force vs. velocity envelopes for the actuator mechanism are illustrated in FIG. 4. Force hold energy consumption (e.g., power hold) refers to the rate of energy consumption by the actuation mechanism to sustain a force output. Energy regeneration refers to the ability of the actuation mechanism to generate electrical energy from force applied thereto. The different actuation mechanisms may, for example, electromagnetic linear actuators, lead screw actuators ball screw actuators, air spring actuators, and hydraulic actuators, which will be discussed in further detail below with respect to specific embodiments of the suspension actuator 270. Lead screw actuators and ball screw actuators may be referred to as mechanical linear actuator mechanisms.

The first actuator mechanism 372 provides force output for primary ride control of road disturbances, to control force transfer from road disturbances to the vehicle body 110 (e.g., to provide passenger comfort) and to maintain contact of the tire and wheel assembly 264 with the road surface (e.g., to maintain friction contact for drive, braking, and steering control). Controlling primary ride requires the first actuator mechanism to operate at a relatively high frequency (e.g., around 2 Hz) and at relatively high forces. As such, the first actuator mechanism 372 is high velocity, high force actuation mechanism, which is capable of producing high force output at high velocities to cause and resist movement between the sprung mass 310 and the unsprung mass 360. The first actuator mechanism 372 is capable of producing force within an area of a first operating envelope 472 illustrated in FIG. 4. The first actuator mechanism 372 may be considered a high bandwidth actuator.

The first actuator mechanism 372 has high power hold, and energy regeneration capability.

Figure 5:
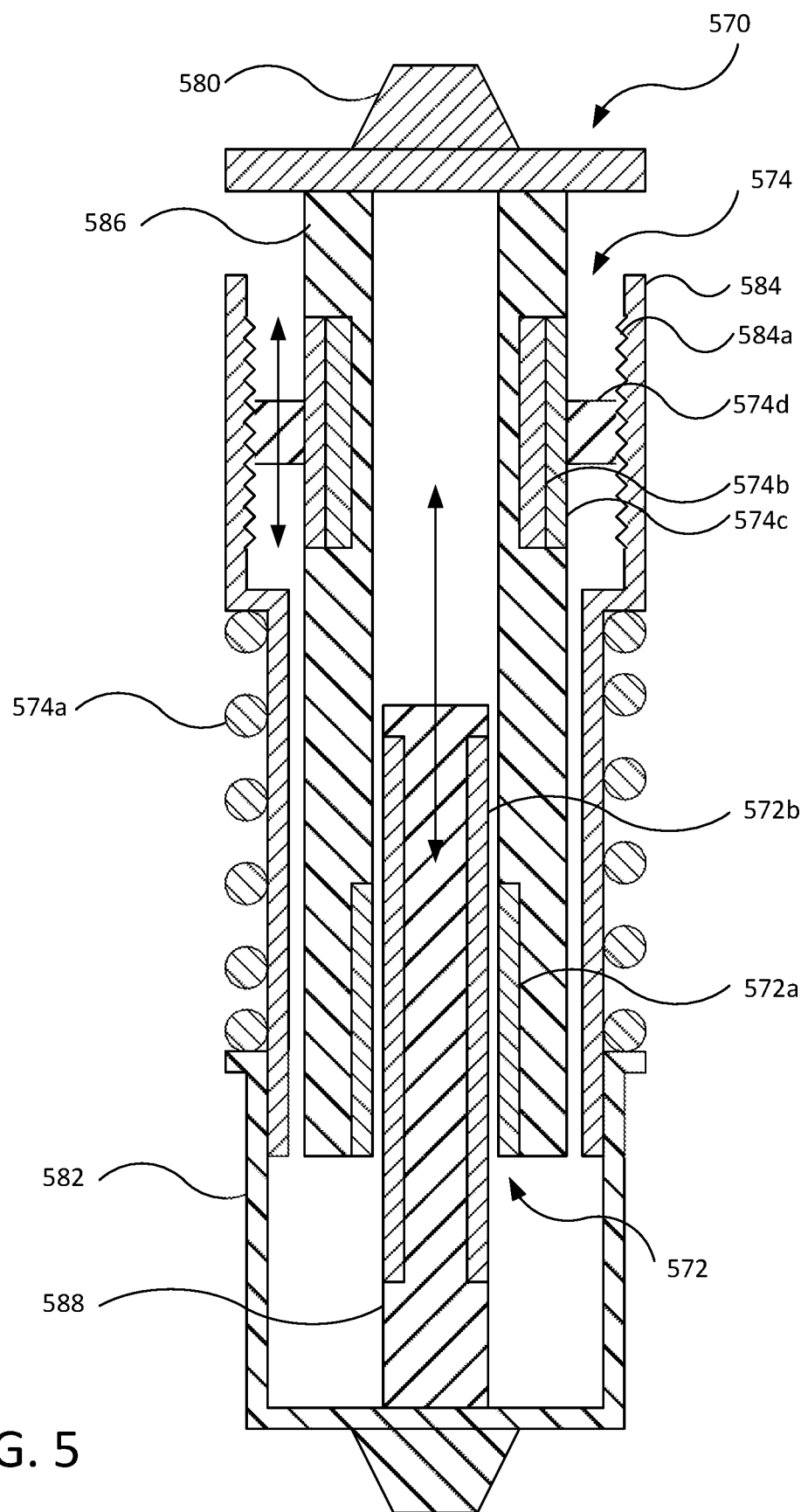
FIG. 5 is a cross-sectional view of an embodiment of a suspension actuator for use in the suspension assembly of FIG. 1.
Figure 6:
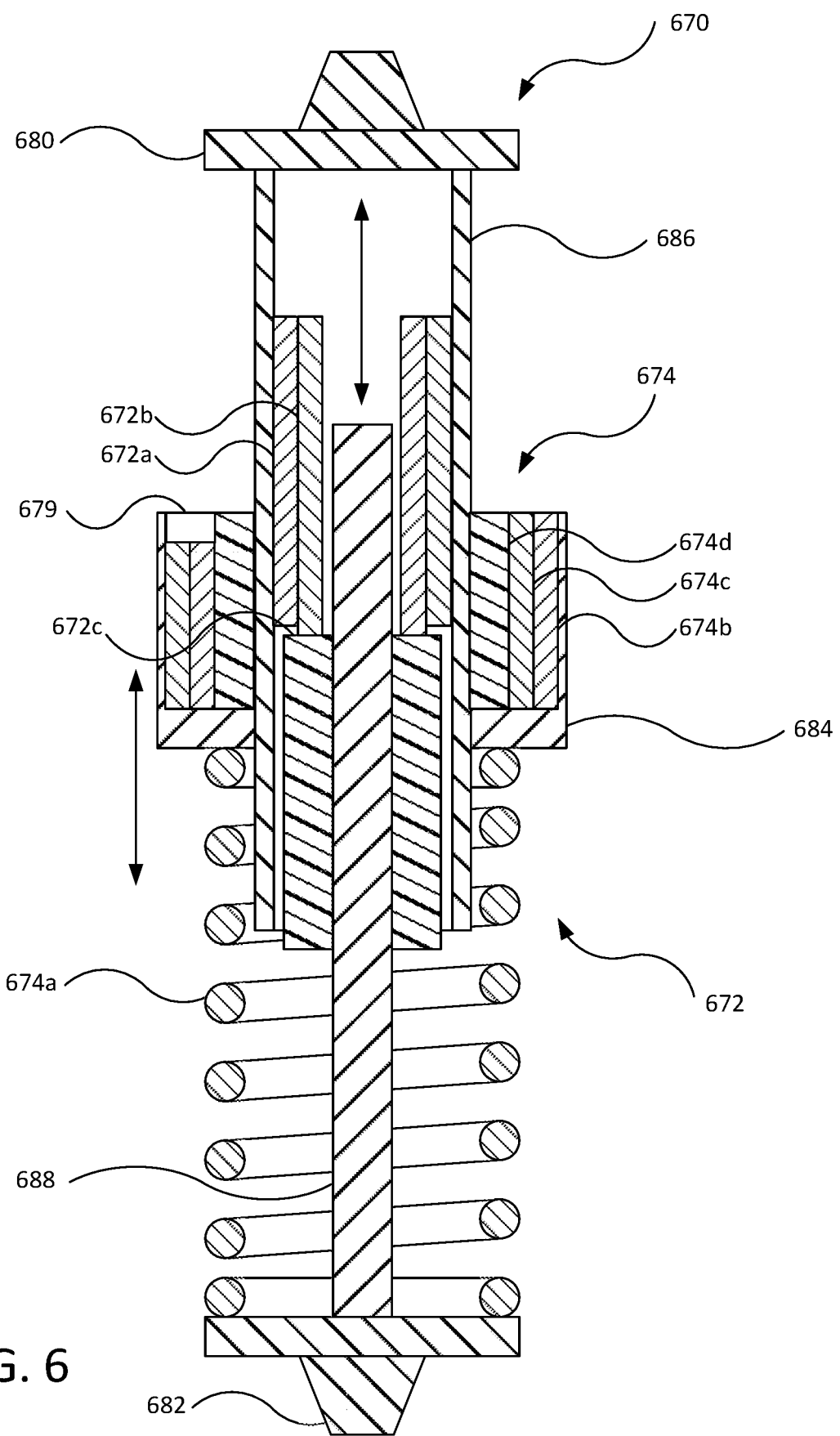
FIG. 6 is a cross-sectional view of another embodiment of a suspension actuator for use in the suspension assembly of FIG. 1.

The first actuator mechanism 372 may, for example, be an electromagnetic linear actuator (e.g., a voice coil; see suspension actuator 570 shown in FIG. 5) or a ball screw actuator (see suspension actuator 670 shown in FIG. 6).

The second actuator mechanism 374 provides sustained force output between the sprung mass 310 and the unsprung mass 360. For example, when the vehicle 100 is at rest, the second actuator mechanism 374 may provide the only output force from the suspension actuator 270 for supporting the vehicle 100 (e.g., the first actuator mechanism 372 produces no output force). When the vehicle 100 is moving, the second actuator mechanism 374 may sustain an output force, so as to provide a ride height of the vehicle 100, to resist a tendency of the vehicle 100 to roll (e.g., lean outward about a roll axis as the vehicle 100 travels around a corner), or to resist a tendency of the vehicle 100 to pitch (e.g., dive forward during deceleration or squat rearward during acceleration). The second actuator mechanism 374 is a low velocity, high force actuation mechanism, which is capable of producing high force output up to low velocities to cause and resist movement between the sprung mass 310 and the unsprung mass 360. The second actuator mechanism 374 may, for example, be capable of output force at higher magnitudes than the first actuator mechanism 372. The second actuator mechanism 374 is capable of outputting force within an area of the second operating envelope 474 illustrated in FIG. 4. The second actuator mechanism 374 may be considered a low bandwidth actuator (e.g., lower bandwidth relative to the high bandwidth of the first actuator mechanism 374).

The second actuator mechanism 374 may also be arranged to apply force between the sprung mass 310 and the unsprung mass 360 in conjunction with spring 374a. For example, the second actuator mechanism 374 may be arranged in series with the spring 374a between the sprung mass 310 and the unsprung mass 360. In the case of the second actuator mechanism 374 being an air spring, the spring 374a is considered incorporated into and formed by the second actuator mechanism 374. By moving to apply force to the spring 374a, the second actuator mechanism 374 may be referred to as a spring seat actuator.

The second actuator mechanism 374 may have high mechanical advantage as compared to the first actuator mechanism 372, such the second actuator mechanism 374 may require a comparatively low input force to achieve a given output force. The second actuator mechanism 374 may have low power hold as compared to the first actuator mechanism 372, such that the second actuator mechanism 374 consumes comparatively less energy (e.g., none) to maintain a given force output between the sprung mass 310 and the unsprung mass 360. The second actuator mechanism 374 may, depending on type, provide regeneration.

Figure 9:
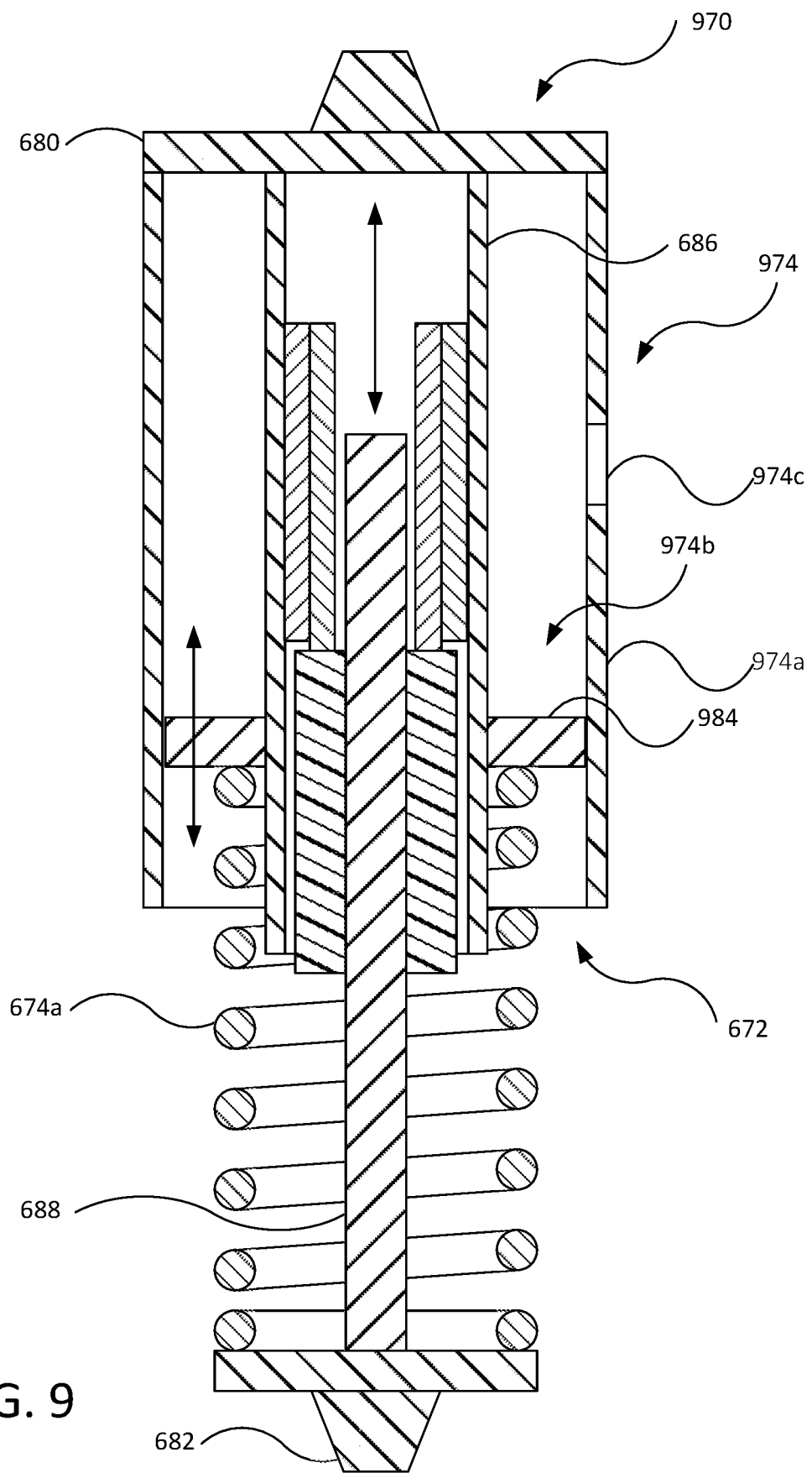
FIG. 9 is a cross-sectional view of another embodiment of a suspension actuator for use in the suspension assembly of FIG. 1.

The second actuator mechanism 374 may, for example, be a lead screw actuator (see the suspension actuator 570 in FIG. 5), a ball screw actuator (see the suspension actuator 670 in FIG. 6), an air spring (see suspension actuator 770 in FIG. 7A), or a hydraulic actuator (see suspension actuator 970 in FIG. 9).

Referring to the suspension actuator 270' in FIG. 3B, the third actuator mechanism 376 may be configured in different manners to supplement the output forces applied by the first actuator mechanism 372 and the second actuator mechanism 374.

In one example, the third actuator mechanism 376 provides velocity dependent force only to resist, but not cause, motion between the sprung mass 310 and the unsprung mass 360. In this example, the third actuator mechanism 376 applies increasing magnitude force between the sprung mass 310 and the unsprung mass 360 with increasing speed therebetween. The third actuator mechanism 376 provides no output force at zero velocity, and high output force at high velocities. The third actuator mechanism 376 is capable of outputting force in quadrants 2 and 4, but not quadrants 1 and 3, within the operating envelope 476a. The third actuator mechanism 376 may provide high output force, which is velocity dependent, with little to no energy input, and has a zero-power hold, but does not provide regeneration. In this first example, the third actuator mechanism 376 may, for example, be a hydraulic damper controlled by a throttling valve (see suspension actuator 770 in FIG. 7A).

In a second example, the third actuator mechanism 376 is a high velocity, high force actuation mechanism, which is capable of producing high force output at high velocities to cause and resist movement between the sprung mass 310 and the unsprung mass 360. The third actuator mechanism 376 may, for example, be capable of output force at magnitudes higher or lower (as shown) than the first actuator mechanism 372. In this example, the third actuator mechanism 376 may have high mechanical advantage as compared to the first actuator mechanism 372, such the third actuator mechanism 376 requires a comparatively low input force to achieve a given output force. The third actuator mechanism 376 have low, but non-zero, power hold as compared to the first actuator mechanism 372, such that the second actuator mechanism 374 consumes comparatively less energy to maintain a given force output between the sprung mass 310 and the unsprung mass 360. The third actuator mechanism 376 provides regeneration. In this other example, the third actuator mechanism 376 may be a hydraulic damper controlled by a pump (see suspension actuator 870 in FIG. 8).

Referring to the suspension actuator 270" in FIG. 3C, the third actuator mechanism 376 may be configured as the first example described above, while the fourth actuator mechanism 378 is configured as the second example of the third actuator mechanism 376 described above. The third actuator mechanism 376 may, for example, be a hydraulic damper controlled by a throttling valve, while the fourth actuator mechanism 378 may be the same hydraulic damper further controlled by a pump (see the suspension actuator 870 in in FIG. 8).

In FIG. 5, the suspension actuator 570 is a two-element actuator that includes an electromagnetic linear actuator mechanism 572 and a lead screw actuator mechanism 574. The electromagnetic linear actuator mechanism 572 and the lead screw actuator mechanism 574 function similar to the first actuator mechanism 372 and the second actuator mechanism 374, respectively, of the suspension actuator 270. More particularly, the electromagnetic linear actuator mechanism 572 is the primary actuator for controlling primary ride with road disturbances, while the lead screw actuator mechanism 574 provides a sustained force output.

The suspension actuator 570 includes an upper mount 580 and a lower mount 582 by which the suspension actuator 570 is couple able to the sprung mass 310 and the unsprung mass 360. The electromagnetic linear actuator mechanism 572 forms a first load path between the upper mount 580 and the lower mount 582. The lead screw actuator mechanism 574 is arranged in series with a spring 574a to form a second load path, parallel with the first load path, between the upper mount 580 and the lower mount 582. The lead screw actuator mechanism 574 is operable to move a spring seat member 584 axially relative to the upper mount 580 and to increase or decrease the force applied by the between the sprung mass 310 and the unsprung mass 360 to hold or move the position of the spring seat member 584 (e.g., to counter roll or pitch of the vehicle 100). By changing displacement of the spring seat member 584, the lead screw actuator mechanism 574 may be referred to as a spring seat actuator.

The suspension actuator 570, for example, includes an annular structure 586 connected to the upper mount 580 to move therewith and a shaft 588 connected to the lower mount 582 to move therewith. The electromagnetic linear actuator mechanism 572 is formed between annular structure 586 and the shaft 588, such that the shaft 588 reciprocates linearly within the annular structure. The electromagnetic linear actuator mechanism 572 includes an outer coil 572a fixed to an inner portion of the annular structure 586 and an inner magnet 572b fixed to an outer portion of the shaft 588. As current is applied to the outer coil 572a, a magnetic field is generated that passes through the inner magnet 572b to apply axial force to the shaft 588.

The lead screw actuator mechanism 574 is formed between the annular structure 586 and the spring seat member 584. The lead screw actuator mechanism 574 includes a stator 574b and a rotor 574c that form an electric motor. The stator 574b is fixed to an outer portion of the annular structure 586, while the rotor 574c is positioned radially outward thereof and is rotated thereby. The rotor 574c threadably engages the spring seat member 584, such that rotation of the rotor 574c moves the spring seat member 584 toward or away from the upper mount 580. For example, the rotor 574c includes an outer threaded member 574d coupled thereto and extending radially outward thereof, which engages an inner threaded portion 584a of the spring seat member 584. Furthermore, when the electromagnetic linear actuator mechanism 572 is operated, the shaft 588 may be received axially by the lead screw actuator mechanism 574.

The lower mount 582 and the spring seat member 584 may cooperatively define a housing, which contain both the electromagnetic linear actuator mechanism 572 and the lead screw actuator mechanism 574. Furthermore, while the lower mount 582 engages the spring 574a to form a lower spring seat, one or more intermediate structures may be arranged between the spring 574a and the lower mount 582.

Referring to FIG. 6, the suspension actuator 670 is a two-element actuator that includes a first ball screw actuator mechanism 672 and a second ball screw actuator mechanism 674. The first ball screw actuator mechanism 672 and the second ball screw actuator mechanism 674 function similar to the first actuator mechanism 372 and the second actuator mechanism 374, respectively, of the suspension actuator 270. More particularly, the first ball screw actuator mechanism 672 is the primary actuator for controlling primary ride with road disturbances, while the second ball screw actuator mechanism 674 provides a sustained force output. The second ball screw actuator mechanism 674 may have greater mechanical advantage than the first ball screw actuator mechanism 672, for example, by having a lower thread pitch. The first ball screw actuator mechanism 672 and the second ball screw actuator mechanism 674 are both capable of regeneration.

The suspension actuator 670 includes an upper mount 680 and a lower mount 682 by which the suspension actuator 670 is coupleable to the sprung mass 310 and the unsprung mass 360. The first ball screw actuator mechanism 672 forms a first load path between the upper mount 680 and the lower mount 682. The second ball screw actuator mechanism 674 is arranged in series with a spring 674a to form a second load path, parallel with the first load path, between the upper mount 680 and the lower mount 682. The second ball screw actuator mechanism 674 is operable to move a spring seat member 684, axially relative to the upper mount 680 and to increase or decrease the force applied between the sprung mass 310 and the unsprung mass 360 to hold or move the position of the spring seat member 684.

The suspension actuator 670, for example, includes an annular structure 686 connected to the upper mount 680 to move therewith and a shaft 688 connected to the lower mount 682 to move therewith. The first ball screw actuator mechanism 672 is connected between annular structure 686 and the shaft 688, such that the shaft 688 reciprocates linearly within the annular structure 686. The first ball screw actuator mechanism 672 includes an electric motor having an outer stator 672a fixed to an inner portion of the annular structure 686 and a rotor 672b fixed to a ball nut 672c (e.g., having recirculating balls not shown), which is in turn operably engaged with the shaft 688. As current is applied to the outer stator 672a, the rotor 672b and, thereby, the ball nut 672c are rotated. As a result, torque is applied to the ball nut 672c, which applies axial force between the annular structure 686 and the shaft 688. The first ball screw actuator mechanism 672

The second ball screw actuator mechanism 674 is connected between the annular structure 686 and the spring seat member 684. The second ball screw actuator mechanism 674 includes a stator 674b and a rotor 674c that form an electric motor. The stator 674b is fixed to an outer portion of the spring seat member 684, while the rotor 674c is positioned radially inward thereof and is rotated thereby. The rotor 674c rotates another ball nut 674d, which is in turn operably engaged with the annular structure 686 (e.g., functioning as a shaft). As current is applied to the stator 674b, the rotor 674c and, thereby, the ball nut 674d are rotated. As a result, torque is applied to the ball nut 674d, which applies axial force between the annular structure 686 and the spring seat member 684, so as change or hold the position of the spring seat member 684 relative to the sprung mass 310. By changing displacement of the spring seat member 684, the second ball screw actuator mechanism 674 may be referred to as a spring seat actuator.

Alternatively, a lead screw actuator mechanism, such as the lead screw actuator mechanism 574, may be used instead of the second ball screw actuator mechanism 674, and in combination with the first ball screw actuator mechanism 672. As another alternative, a hydraulic actuator mechanism may be used instead of the second ball screw actuator mechanism 674 (see suspension actuator 970 in FIG. 9). In still further variations, the second ball screw actuator mechanism 674 may include a brake (e.g., a mechanical brake that prevents rotation of the rotor 674c) that provides the second ball screw actuator mechanism 674 with low or no power hold. In still further variation, the second ball screw actuator mechanism 674 may be operated by a motor that is not coaxial with the first ball screw actuator mechanism 672. For example, the motor may be laterally offset and parallel to the shaft 688 being operably coupled to the ball nut 674d, for example, with an intermediate gear.

A variation of the suspension actuator 670 may further include an air spring actuator mechanism arranged in parallel with the first ball screw actuator 672 and the second ball screw actuator 674. For example, the air spring actuator mechanism may include an air chamber generally concentric with the annular structure 686 and configured to apply force between the upper mount 680 and the spring seat member 684.

Figure 7A:
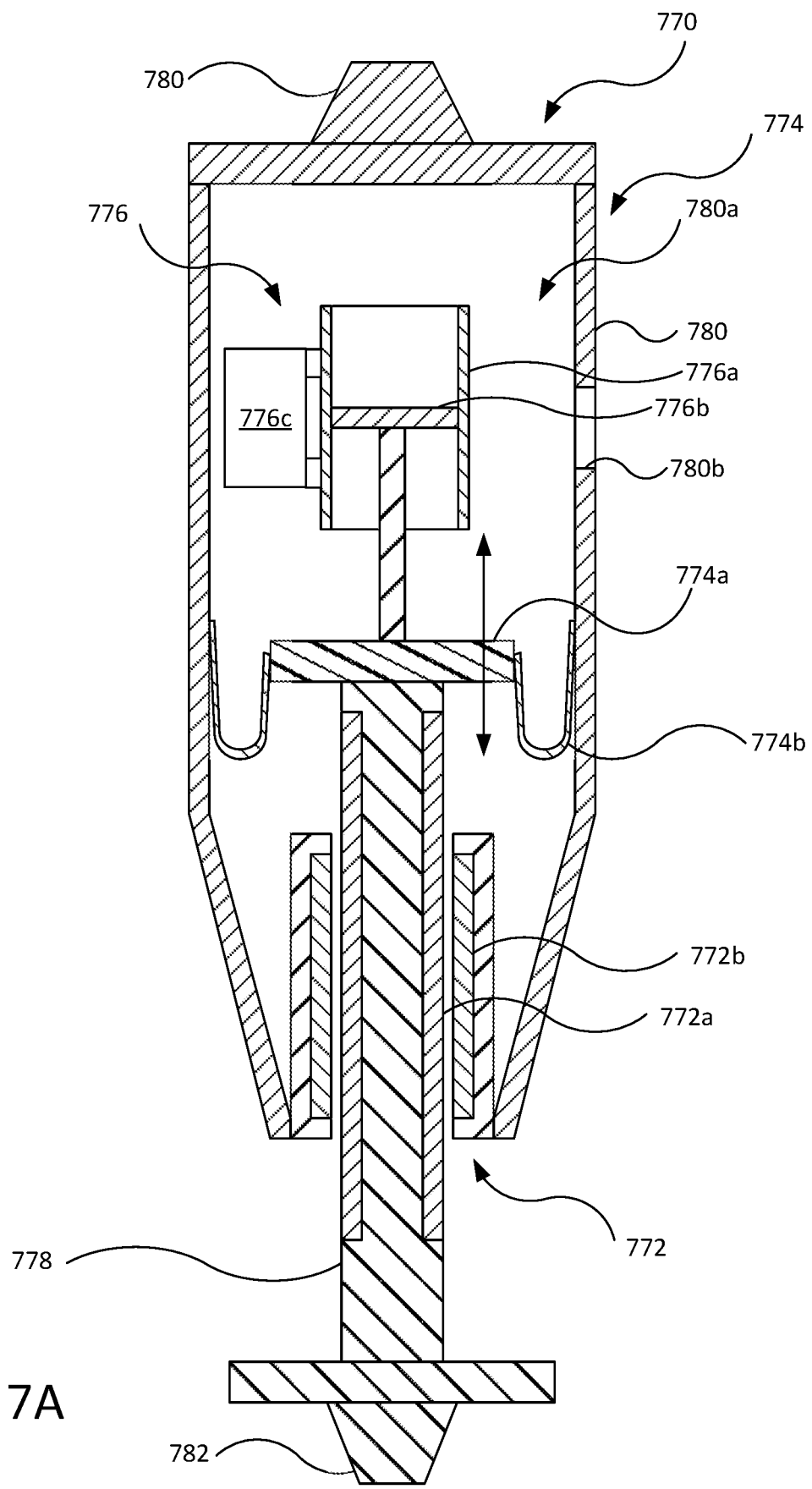
FIG. 7A is a cross-sectional view of another embodiment of a suspension actuator for use in the suspension assembly of FIG. 1.

In FIG. 7A, the suspension actuator 770 is a three-element actuator that includes an electromagnetic linear actuator mechanism 772, an air spring actuator mechanism 774, and a hydraulic actuator mechanism 776. The electromagnetic linear actuator mechanism 772, the air spring actuator mechanism 774, and the hydraulic actuator mechanism 776 function similar to the first actuator mechanism 372, the second actuator mechanism 374, and the third actuator mechanism, respectively of the suspension actuator 270'. More particularly, the electromagnetic linear actuator mechanism 772 is the primary actuator for controlling primary ride with road disturbances, while the air spring actuator mechanism 774 provides a sustained force output, and the hydraulic actuator mechanism 776 provides additional velocity dependent resistance, and low power hold. The electromagnetic linear actuator mechanism 772, the air spring actuator mechanism 774, and the hydraulic actuator mechanism 776 apply force between the sprung mass 310 and the unsprung mass 360 in parallel.

The electromagnetic linear actuator mechanism 772 is configured substantially similar to the electromagnetic linear actuator mechanism 572 described previously. The electromagnetic linear actuator mechanism 772 generally includes a shaft 778, a magnet 772a coupled to the shaft 778, and a coil 772b coupled to a housing 780. A lower end of the shaft 778 is configured to couple to the unsprung mass 360, such as with a lower mount 782. Alternatively, the electromagnetic linear actuator mechanism 772 may be replaced with a ball screw actuator mechanism, such as the first ball screw actuator mechanism 672.

The air spring actuator mechanism 774 generally includes the housing 780, which is rigid and defines a chamber 780a therein. The air spring actuator mechanism 774 further includes a piston or plate member 774a and a membrane 774b that couples the plate member 774a to the housing 780. The plate member 774a is connected to an upper end of the shaft 778. An air source (not labeled) is in fluidic communication with the chamber 780a via a port 780b to provide compressed air thereto. As air is added to or removed from the chamber 780*a*, the distance between the sprung mass 310 and the unsprung mass 360 is increased or decreased, respectively. As pressure increases or decreases in the chamber 780*a*, greater or less force is applied to the plate member 774*a*, so as to apply greater or lesser force to the shaft 778.

The hydraulic actuator mechanism 776 includes a cylinder 776*a*, a piston 776*b*, and a throttling valve 776*c*. The piston 776*b* is coupled to the shaft 778 of the electromagnetic linear actuator mechanism 772 and/or to the plate member 774*a* of the air spring actuator mechanism 774. The piston 776*b* moves within the cylinder 776*a* that is coupled to the housing 780, such that force may be transferred from the cylinder 776*a* to the housing 780 and, ultimately, the sprung mass 310. The cylinder 776*a* contains fluid on each side of the piston 776*b*. The throttling valve 776*c* selectively allows communication of the fluid between each side of the piston 776*b* as the piston 776*b* moves. The hydraulic actuator mechanism 776, thereby, functions as an adjustable output hydraulic damper that applies variable, velocity-dependent force dependent.

Figure 7B:
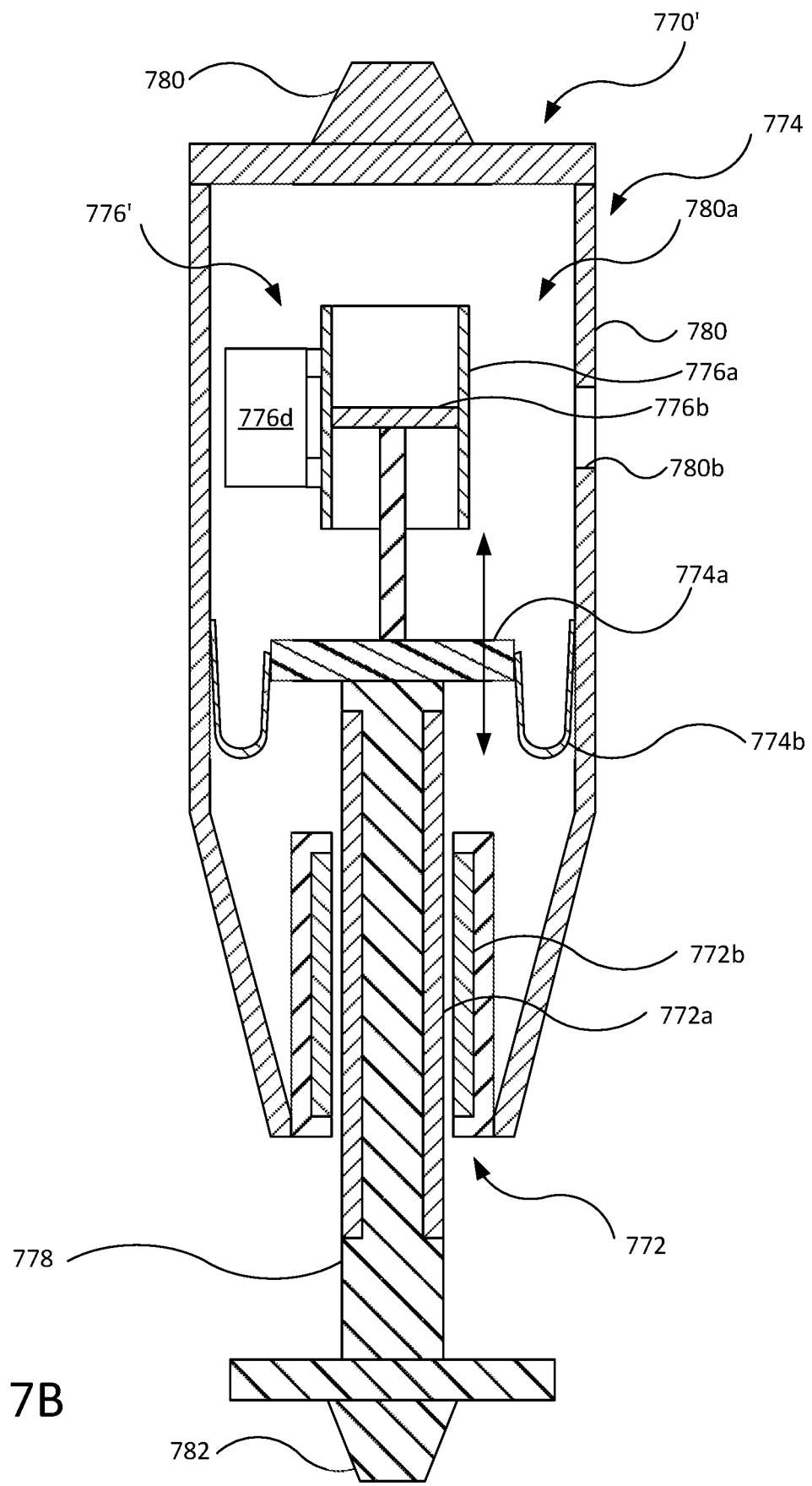
FIG. 7B is a cross-sectional view of a variation of the suspension actuator of FIG. 7A.

Referring to FIG. 7B, a suspension actuator 770' is a variation of the suspension actuator 770, which includes a hydraulic actuator mechanism 776' having a pump 776*d* instead of the throttling valve 776*c*. The pump 776*d* may provide regeneration but requires power for holding the piston 776*b* in a position within the cylinder 776*a*.

In a still further variation, a suspension actuator assembly may include both the hydraulic actuator mechanism 776 (i.e., having the throttling valve 776*c*) and the hydraulic actuator mechanism 776' (i.e., having the pump 776*d*), which act in parallel to each other (see the suspension actuator 270" in FIG. 3B).

Figure 8:
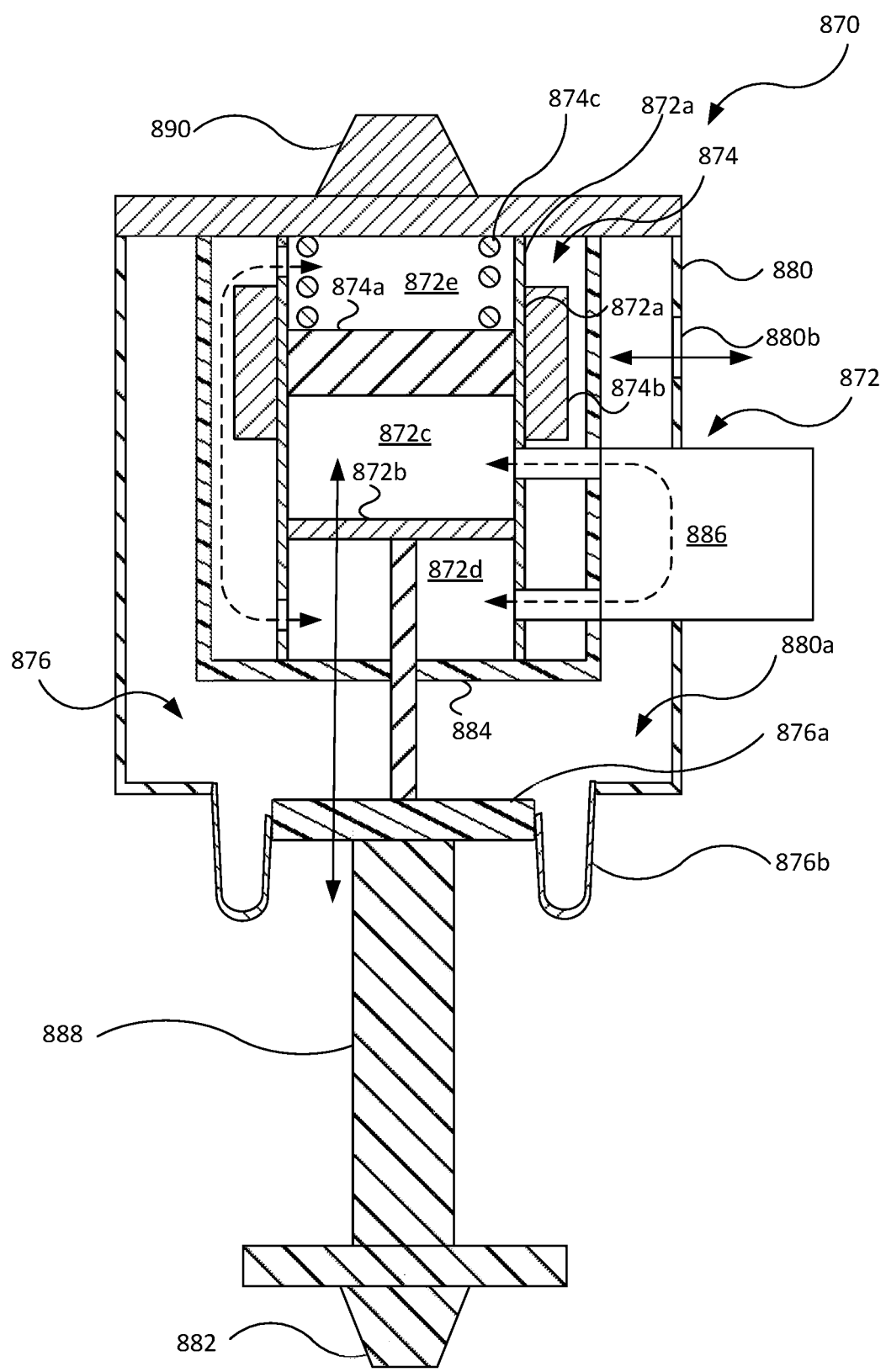
FIG. 8 is a cross-sectional view of another embodiment of a suspension actuator for use in the suspension assembly of FIG. 1.

FIG. 8, a suspension actuator 870 includes a hydraulic actuator 872, an electromagnetic linear actuator 874, and an air spring actuator 876. The hydraulic actuator 872 generally includes a cylinder 872*a* and a piston 872*b* movable within the cylinder 872*a*. The piston 872*b* is in turn coupled to a shaft 888 that is connectable to the unsprung mass 360 (e.g., via a lower mount 882). The piston 872*b* forms an intermediate chamber 872*c* and a lower chamber 872*d* within the cylinder 872*a*, and a pump 886 controls flow of a fixed volume of fluid therebetween (as indicated by a dashed arrow). As fluid is moved into the intermediate chamber 872*c*, the piston 872*b* is biased downward.

The electromagnetic linear actuator 874 is arranged in parallel with the hydraulic actuator 872 to apply force between the sprung mass 310 and the unsprung mass 360. The electromagnetic linear actuator 874 includes another piston 874*a*, which forms the upper end of the intermediate chamber 872*c* and further defines an upper chamber 872*e* in the cylinder 872*a*. The piston 874*a* includes a magnet, while a coil 874*b* is arranged around the cylinder 872*a*. A spring 874*c* is arranged between an upper end of the of the suspension actuator 870 (e.g., an upper mount 890 thereof). As current is sent to the coil 874*b*, the coil 874*b* generates a magnetic field that moves the piston 874*a* axially, which acts on the fluid in the intermediate chamber 872*c* and, if fixed or restricted in volume by the pump 886, causes the piston 872*b* to move and, thereby, the fluid to flow between the upper chamber 872*e* in fluidic communication with the lower chamber 872*d*.

The air spring actuator 876 is arranged in parallel with the hydraulic actuator 872 and the electromagnetic linear actuator 874. The air spring actuator 876 is configured similar to the air spring actuator mechanism 774 described with respect to FIG. 7. The air spring actuator 876 includes a chamber 880*a*, which receives compressed air, and a piston 876*a* (e.g., plate member) that is movably coupled to an outer housing 880 and is fixedly connected to the shaft 888 and the piston 872*b*. As air is added to or removed from the chamber 780*a*, the distance between the sprung mass 310 and the unsprung mass 360 is increased or decreased, respectively. As pressure is increased in the chamber 880*a*, the pressure forces the shaft 888 downward. The chamber 880*a* is defined between the outer housing 880 and an inner housing 884, which may contain the hydraulic actuator 872 and the electromagnetic linear actuator 874. Air is supplied to the chamber 880*a* via a port 880*b* in the outer housing 880.

Referring to FIG. 9, a suspension actuator 970 is configured substantially similar to the suspension actuator 670, but rather than including the second ball screw actuator mechanism 674, the suspension actuator 970 includes a hydraulic actuator mechanism 974, which functions as a high force, low velocity actuator. The hydraulic actuator mechanism 974 acts in series with the spring 674*a* between the sprung mass 310 and the unsprung mass 360. The suspension actuator 970 includes the first ball screw actuator mechanism 672, which acts in parallel to the hydraulic actuator mechanism 974 between the sprung mass 310 and the unsprung mass 360, along with various other components described with respect to the suspension actuator 670 in FIG. 6. Alternatively, the suspension actuator 970 may include the magnetic linear actuator 572, or another high force, high velocity linear actuator. By using the hydraulic actuator mechanism 974 in combination with the linear actuator 672, or the linear actuator 572, the suspension actuator 970 may output force for sustained loading (e.g., turns and braking events), which reduces the required force output and energy consumption otherwise required of the linear actuator 672 for certain ride control (e.g., limiting roll during turns, and limiting pitch during braking events). The suspension actuator 970 may also be referred to as a suspension actuator assembly, while the hydraulic actuator mechanism 974 may be referred to as a hydraulic actuator or hydraulic spring seat.

The hydraulic actuator mechanism 974 is configured to move a spring seat 984 axially, so as to apply force via the spring 674*a* between the sprung mass 310 and the unsprung mass 360, for example, to change a height of the vehicle 100 (i.e., a distance between the sprung mass 310 and the unsprung mass 360) to control roll of the vehicle 100 and/or to control pitch of the vehicle 100. The hydraulic actuator mechanism 974 generally includes a housing 974*a* that is fixed axially relative to an upper end (e.g., an upper mount 680) of the suspension actuator 970. The housing 974*a* defines a chamber 974*b* (e.g., cylinder or cylindrical chamber) that surrounds the annular structure 686. The spring seat 984 is arranged as a piston within the chamber 974*b*. The housing 974*a* includes a port 974*c* through which the hydraulic actuator mechanism 974 receives a hydraulic fluid, which is generally non-compressible, from a fluid source. The hydraulic fluid fills the chamber 974*b* to press the spring seat 984 against the spring 674*a*, whereby a position of the spring seat 984 may be changed relative to the sprung mass 310 and the force applied to the spring 674*a* may be varied (e.g., as loading changes, such as during roll and pitch events). By changing displacement of the spring seat 984, the hydraulic actuator mechanism 974 may be referred to as a spring seat actuator. While the hydraulic actuator mechanism 974 is generally coaxial with (e.g., surrounds) the ball screw actuator mechanism 672 and provides packaging advantages thereby, other configurations are contemplated (e.g., being laterally offset).

Figure 10:
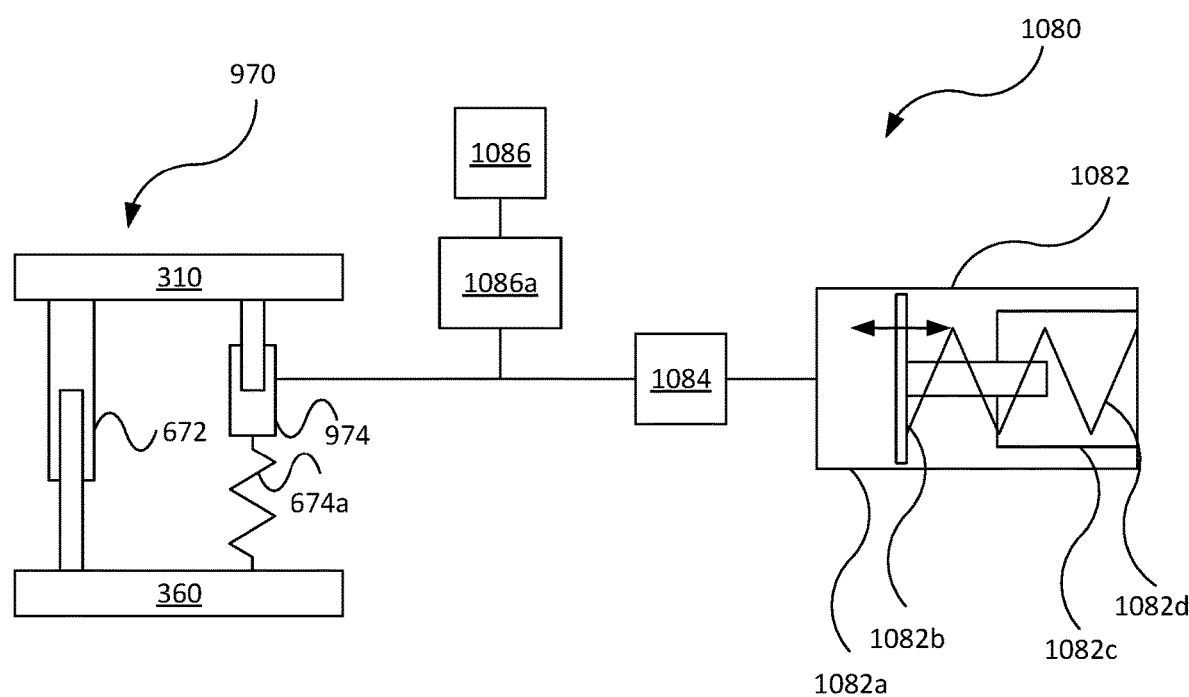
FIG. 10 is a schematic view of a hydraulic circuit including the suspension actuator of FIG. 9 and an embodiment of a pump actuator.

Referring to FIG. 10, the suspension actuator 970 is depicted schematically with the ball screw actuator mechanism 672 acting in parallel with the hydraulic actuator mechanism 974 between the sprung mass 310 and the unsprung mass 360. The hydraulic actuator mechanism 974 is in fluidic communication with a hydraulic circuit 1080 that includes one or more flow control devices, which are interconnected with (e.g., via conduits) and control the volume of the fluid in the chamber 974b. The hydraulic circuit 1080 may include one or more of a pump 1082, an isolation valve 1084, and an accumulator 1086. The pump 1082 is configured to selectively change the amount of fluid in the chamber 974b of the hydraulic actuator mechanism 974 to change displacement thereof. The pump 1082 may also increase or decrease fluid pressure within the hydraulic circuit 1080 to, thereby, apply greater or lesser force to the spring 674a via the spring seat 984 (e.g., during long duration loading events, such as cornering or braking). The pump 1082 may, for example, be configured as a hydraulic cylinder (e.g., master cylinder device), which includes a cylinder 1082a defining a fluid chamber and a piston 1082b therein. The piston 1082b is selectively movable within the cylinder 1082a by an actuator 1082c, so as to provide more or less fluid to the suspension actuator 970. As the amount of the fluid is changed, the volume of the chamber 974b of the hydraulic actuator mechanism 974 changes and, thereby, displacement of the spring seat 984. The actuator 1082c may also apply varying force to the piston 1082b so as to vary pressure within the hydraulic circuit 1080 to hold or change the position of the spring seat 984 as loading of the suspension actuator 1070 changes (e.g., due to roll and/or pitch vehicle events). The actuator 1082c may, for example, be a ball screw actuator (e.g., having a motor that rotates a ball nut to displace a shaft coupled to the piston 1082b). The pump 1082 may additionally include a stability spring 1082d, which applies passive force to the piston 1082b to prevent free movement of the piston 1082b upon failure or loss of power to the actuator 1082c. During normal operation, the force of the stability spring 1082d would need to be overcome by the actuator 1082c to vary and/or hold the position of the spring seat 984. The hydraulic circuit 1080 and other hydraulic circuits disclosed herein may also be referred to as hydraulic systems.

The isolation valve 1084 is arranged in the hydraulic circuit 1080 between the pump 1082 and the hydraulic actuator mechanism 974 of the suspension actuator 970. The isolation valve 1084 is selectively operable (e.g., may be closed) to hold the volume of the hydraulic circuit 1080 to maintain pressure within the hydraulic actuator mechanism 974 and, thereby, force against the spring 674a. The isolation valve 1084, thereby, provides for zero power hold of the hydraulic actuator mechanism 974.

The accumulator 1086 is arranged in the hydraulic circuit 1080 between the hydraulic actuator mechanism 974 and the isolation valve 1084, which provides compliance in the hydraulic circuit 1080. The accumulator 1086 may, for example, be a compressed gas accumulator or a mechanical spring accumulator. The accumulator 1086 may be selectively operated, for example, by having another isolation valve 1086a that selectively isolates the accumulator 1086 from the hydraulic circuit 1080.

As discussed in further detail below, various components of the hydraulic circuit 1080 (e.g., the stability spring 1082d, the isolation valve 1084, and the accumulator 1086) may be used on other configurations of hydraulic circuits.

Figure 11:
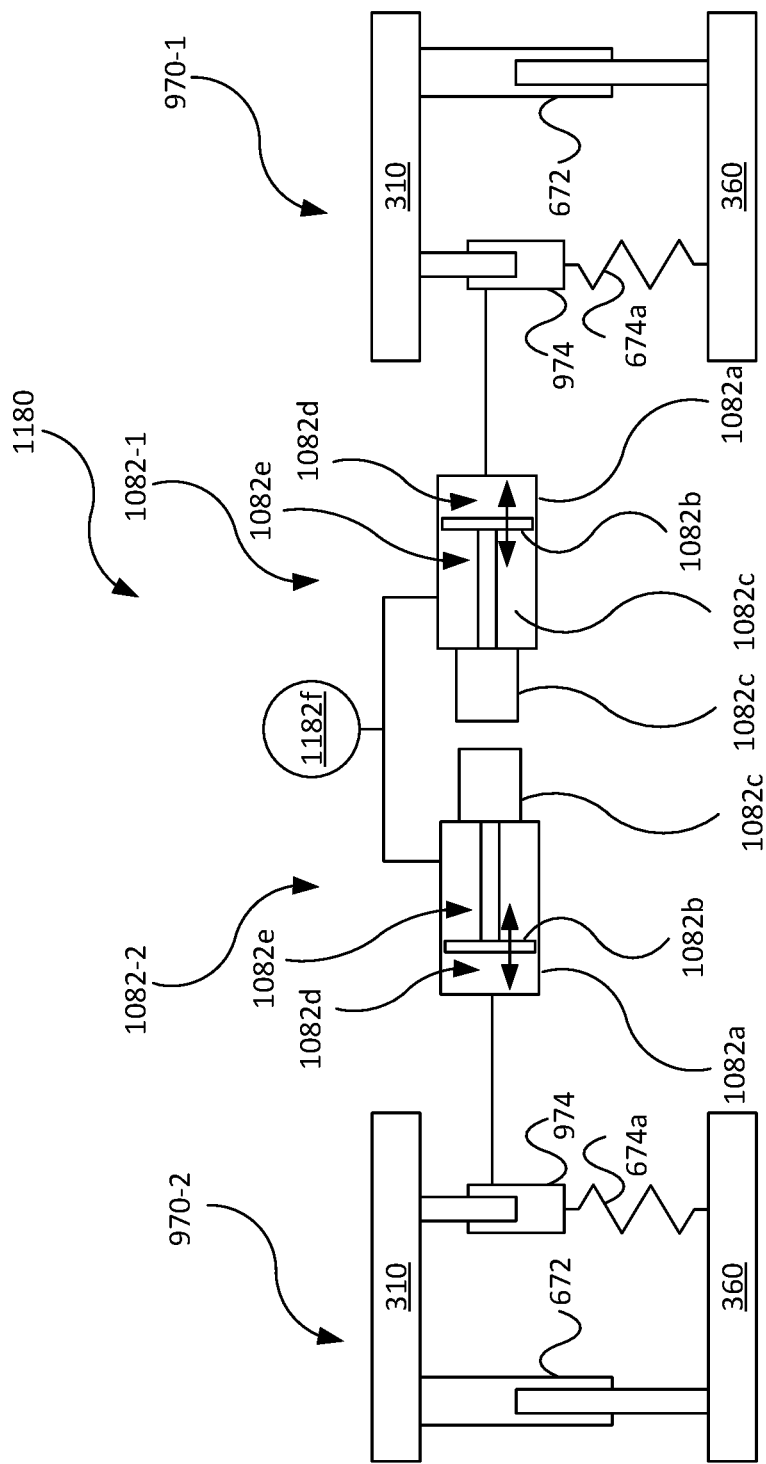
FIG. 11 is a schematic view of another hydraulic circuit including the suspension actuator of FIG. 9 and another embodiment of a pump actuator.

Referring to FIG. 11, a hydraulic circuit 1180 is in communication with the hydraulic actuator mechanisms 974 of two of the suspension actuators 970, so as to transfer loading therebetween. The suspension actuators 970 are each associated with one of two unsprung masses 360 of the vehicle 100. By transferring loading therebetween, the hydraulic actuator mechanisms 974 (or the suspension actuators 970) may be considered hydraulically coupled or hydraulically linked. Such an arrangement may be advantageous in scenarios where force transfer and/or relative displacement between two suspension actuators 970 is desirable, such as to control roll and pitch of the vehicle 100, which are the vehicle tilting side-to-side and front-to-back, respectively, during turning or acceleration events. Roll of the vehicle 100 may be controlled with the suspension actuators 970 on left and right sides at each end of the vehicle 100 being interconnected by the hydraulic circuit 1180. Pitch of the vehicle 100 may be controlled with the suspension actuators 970 at front and rear ends on each side of the vehicle being interconnected by the hydraulic circuit 1180.

The hydraulic circuit 1180 includes two pump units 1082 (i.e., pump units 1081-1, 10882-2), which are in fluidic communication with the hydraulic actuator mechanisms 974 of the first pump unit 1082-1 and the second pump unit 1082-2 with fixed volumes of fluid in closed circuits. The pump units 1082-1, 1082-2 are configured to selectively and independently control the volume in the chambers 974b of each of the hydraulic actuator mechanisms 974 of the two suspension actuators 970-1, 970-2. The two pump units 1082-1, 1082-2 are also configured to transfer an additional fluid therebetween and, thereby, transfer force between the hydraulic actuator mechanism 974 of the two suspension actuators 970-1, 970-2. More particularly, while one side of each of the cylinders 1082a (e.g., a load side) is in fluid communication with the hydraulic actuator mechanism 974 associated therewith, the other side of each of the cylinders 1082a (e.g., a return side) are in fluid communication with each other, such as by an intermediate conduit extending therebetween. Thus, as the piston 1082b of one of the pump units 1082-1 moves in one direction and presses the fluid in the conduit, such fluid travels through the conduit and presses against the piston 1082b of the other pump units 1082-2 in the opposite direction.

The pump units 1082 (e.g., the return side of the cylinders 1082a) are additionally in communication with an accumulator 1182f. The accumulator 1182f provides compliance between the pump units 1082, so as to allow independent motion therebetween. The two actuators 1082c of the pump units 1082-1, 1082-2 may be operated in unison (e.g., in the same direction and same magnitude to maintain displacement therebetween), which provides generally equal and opposite displacement of the hydraulic actuator mechanisms 974 (e.g., for controlling roll or pitch). The two actuators 1082c of the pump units 1082-1, 1082-b may also be operated out of unison (e.g., in different directions and/or different magnitudes causing relative displacement therebetween), which provides unequal displacement of the hydraulic actuator mechanisms 974, which is permitted by the compliance afforded by the accumulator 1182f. Because of the relative displacement between the two pistons 1182b.

Alternatively, the actuators 1182c may be configured to move only in unison, in which case the accumulator 1182f may be selectively isolated (e.g., with a valve) or may be omitted.

Figure 12:
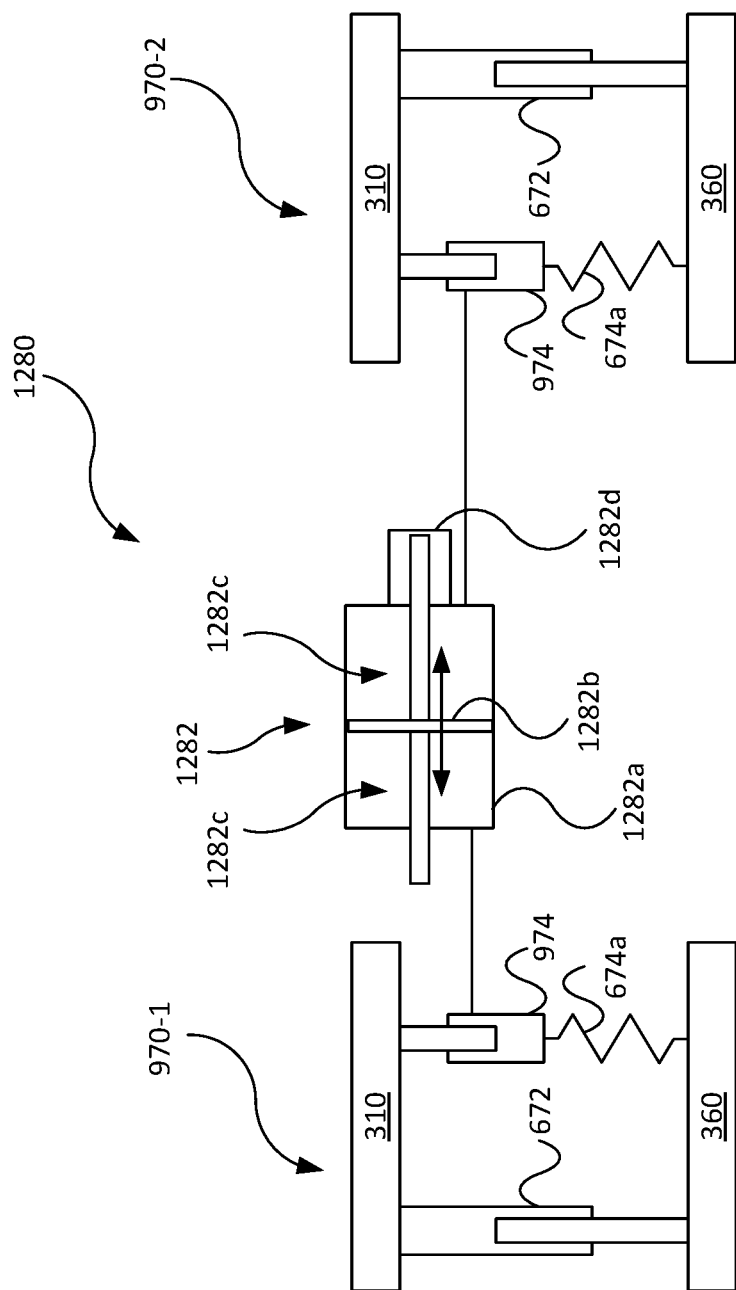
FIG. 12 is a schematic view of another hydraulic circuit including two of the suspension actuators of FIG. 9 and another embodiment of a pump actuator.

Referring to FIG. 12, a hydraulic circuit 1280 is in communication with the hydraulic actuator mechanisms 974 of two of the suspension actuators 970 (i.e., a first suspension actuator 970-1 and a second suspension actuator 970-2). The hydraulic circuit 1280 includes a fixed volume of fluid and a pump unit 1282 arranged between the hydraulic actuator mechanisms 974 of the suspension actuators 970-1, 970-2 in a closed circuit. The pump unit 1282 is configured to provide opposite outputs to each of the two hydraulic actuator mechanisms 974, thereby transferring force between the two hydraulic actuator mechanisms 974. For example, the pump unit 1282 is configured as a hydraulic cylinder that includes a cylinder 1282a and a piston 1282b therein, which divides the cylinder 1282a into two chambers 1282c that are each in communication with one of the hydraulic actuator mechanisms 974 of the two suspension actuators 970-1, 970-2. The piston 1282b is movable by a linear actuator 1282d (e.g., a ball screw actuator, as described above, having an electric motor), so as to inversely change the volume of the two chambers 1282c to control relative displacement of the two hydraulic actuator mechanisms 974, for example, to control roll or pitch of the vehicle 100. By the hydraulic actuator mechanisms 974 being fluidically coupled to opposite sides of the piston 1282b, the pump unit 1282b is not capable by itself of causing simultaneous positive displacement of the two hydraulic actuator mechanism 974.

The pump unit 1282 is operated to control the amount force transferred between the two hydraulic actuator mechanisms 974. For example, the pump unit 1282 may provide no resistance (e.g., is loose) to transfer substantially all force, high resistance (e.g., is stiff) to transfer substantially no force, or variable resistance (e.g., controlled resistance) to transfer otherwise desirable amount of force between the two hydraulic actuator mechanism 974. The loads of the two hydraulic actuator mechanisms may be balanced on either side of the piston 1282b, such that in static conditions, no static load is placed on the pump unit 1282.

To control roll, the vehicle 100 may, for example, include two of the hydraulic circuits 1280 that hydraulically connect left and right suspension actuators 970 at the front and at the rear of the vehicle 100, respectively. For example, during a sustained turning event as the vehicle 100 rolls about a pitch axis toward an outer side of the vehicle 100 (e.g., the right side during a left turn), the suspension actuator 970-2 is on the on outer side of the vehicle 100 (e.g., the right side) and may increase in loading, while the suspension actuator 970-1 is on an inner side of the vehicle 100 (e.g., the left side) and may decrease in loading as compared to static conditions. Fluid may be biased by the pump unit 1282 to the hydraulic actuator mechanism 974 of the outside suspension actuator 970-2 to increase the displacement of the spring seat of the outside suspension actuator 970, and be drawn by the pump unit 1282 from the inside suspension actuator 970-1 to decrease displacement of the spring seat of the inside suspension actuator 970-1 as compared to static conditions. The greater displacement of the outside suspension actuator 970-2 offsets increased compression of the spring 974a, which is caused by increased loading of the outside suspension actuator 970-2 as the vehicle 100 travels around a corner and rolls about a roll axis toward the outside of the vehicle 100. Conversely, the lesser displacement of the inside suspension actuator 970-1 offsets the decreased compression of the spring 974a, which is caused by decreased loading of the inside suspension actuator 970-1 as the vehicle 100 travels around the corner and rolls about the roll axis away from the inside of the vehicle 100. As a result, the outside and the inside of the vehicle 100 experience less net displacement and the passengers thereof may experience less roll than would occur with static spring seats. Furthermore, the linear actuators 672 of the suspension actuators 970 may be operated at a much lower force output than might otherwise might be required to control roll during a sustained turn, thereby decreasing power consumption to resist roll and maintaining capacity (e.g., force and displacement) of the linear actuator 672 to control primary ride (e.g., damping low frequency inputs from the road to the unsprung mass 360).

To control pitch, the vehicle 100 may, instead, include two of the hydraulic circuits 1280 (e.g., left and right hydraulic circuits 1280) that hydraulically connect front and rear suspension actuators 970-1, 970-2 on the left and right sides of the vehicle 100, respectively. During a sustained braking event, the vehicle 100 may tend to pitch forward about a pitch axis, thereby increasing loading to the front suspension actuator 970-1 and may decrease loading to the rear suspension actuator 970-2 as compared to static conditions. The pump unit 1282 may bias the fluid to the hydraulic actuator mechanism 974 of the front suspension actuator 970-1 to increase the displacement of the spring seat of the front suspension actuator 970, and may draw the fluid from the hydraulic actuator mechanism 974 of the rear suspension actuator 970-2 to decrease displacement of the spring seat rear suspension actuator 970, as compared to static conditions. The greater displacement of the front suspension actuator 970-1 offsets increased compression of the spring 974a, which is caused by increased loading as the vehicle 100 brakes and pitches forward. Conversely, the lesser displacement of the rear suspension actuator 970-2 offsets the decreased compression of the spring 974a thereof, which is caused by the decreased loading as the vehicle 100 brakes and pitches away from the rear actuator 970. As a result, the front and the rear of the vehicle 100 experience less net displacement and the passengers thereof may experience less pitch than would occur with static spring seats. Furthermore, the linear actuators 672 of the suspension actuators 970 may be operated at a much lower force output than might otherwise might be required to control pitch during a sustained braking event, thereby decreasing power consumption and maintaining capacity (e.g., force and displacement) of the linear actuator 672 to control primary ride (e.g., damping low frequency inputs from the road to the unsprung mass 360).

Figure 13:
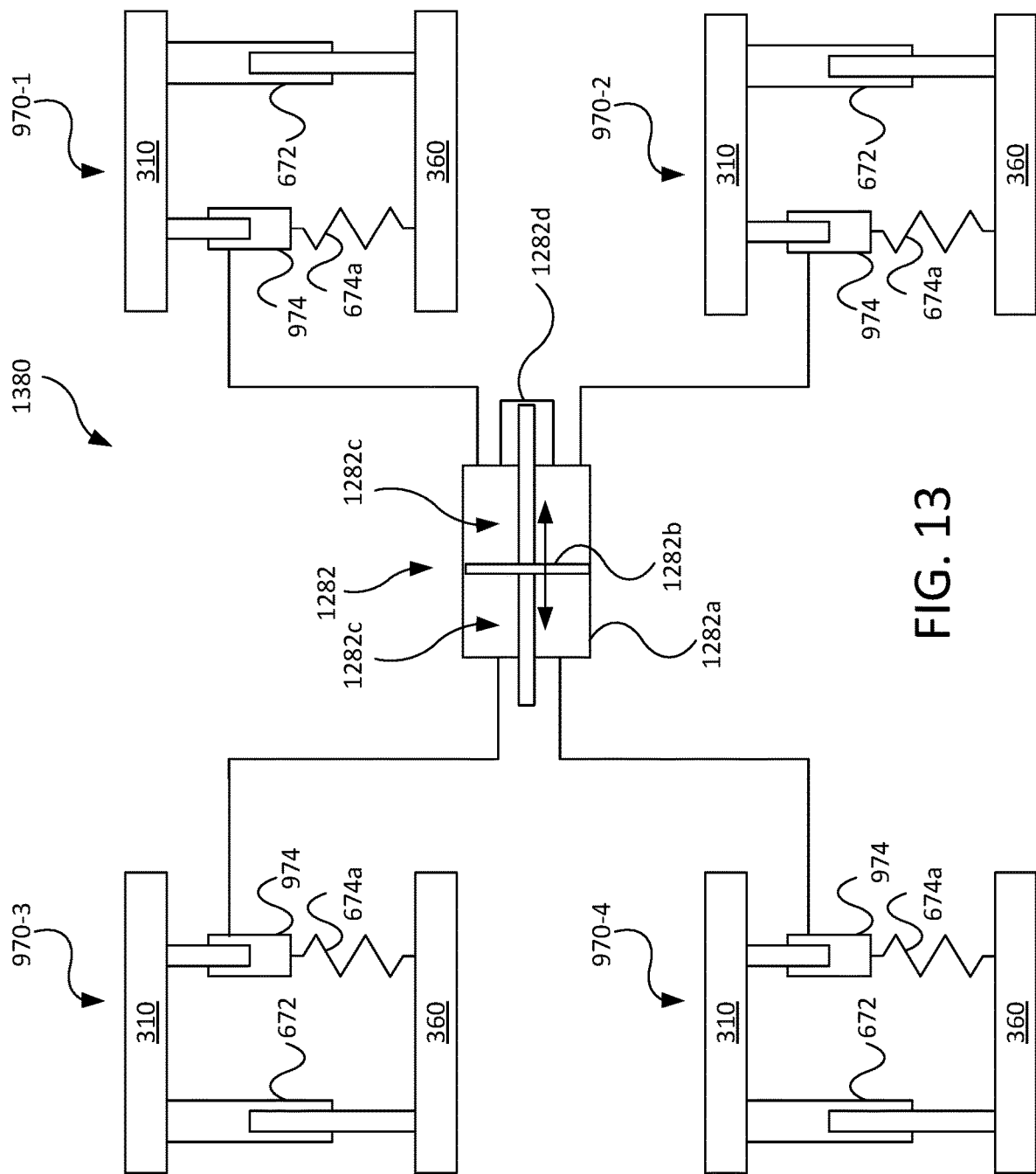
FIG. 13 is a schematic view of another hydraulic circuit including four of the suspension actuators of FIG. 9

Referring to FIG. 13, a hydraulic circuit 1380 is communication with the hydraulic actuator mechanisms 974 of four of the suspension actuators 970-1, 970-2, 970-3, 970-4 (e.g., front left, front right, rear left, and rear right, or alternatively front left, rear left, front right, and rear right). The hydraulic circuit 1380 includes a fixed volume of fluid and a pump unit 1282, configured as described previously. The pump unit 1282 is operated, as described above, to control displacement and the amount force transferred between the hydraulic actuator mechanisms 974 of the first two suspension actuators 970-1, 970-2 and the second two suspension actuators 970-3, 970-4. The loads of the two hydraulic actuator mechanisms 974 may be balanced on either side of the piston 1282b, such that in static conditions, no load is placed on the pump unit 1282. The hydraulic circuit 1380 may be configured to control pitch of the vehicle 100 with a first of the two chambers 1282c in fluidic communication with left and right suspension actuators 970-1, 970-2 at the front of the vehicle 100, and the other chamber 1282c in fluidic communication with left and right suspension actuators 970-3, 970-4 at the rear of the vehicle 100. As a result, during a sustained braking event, the vehicle 100 may, as described above with respect to FIG. 12, pitch less than would a vehicle having static spring seats. Alternatively, the hydraulic circuit 1380 may be configured to control roll of the vehicle 100 with a first of the two chambers 1282c in fluidic communication with front and rear suspension actuators 970, 970-1, 970-2 on the right of the vehicle 100, and the other chamber 1282c in fluidic communication with front and rear suspension actuators 970-3, 970-4 on the left of the vehicle 100. As a result, during a sustained turning event, the vehicle 100 may, as described above with respect to FIG. 12, roll less than would a vehicle having static spring seats.

Figure 14:
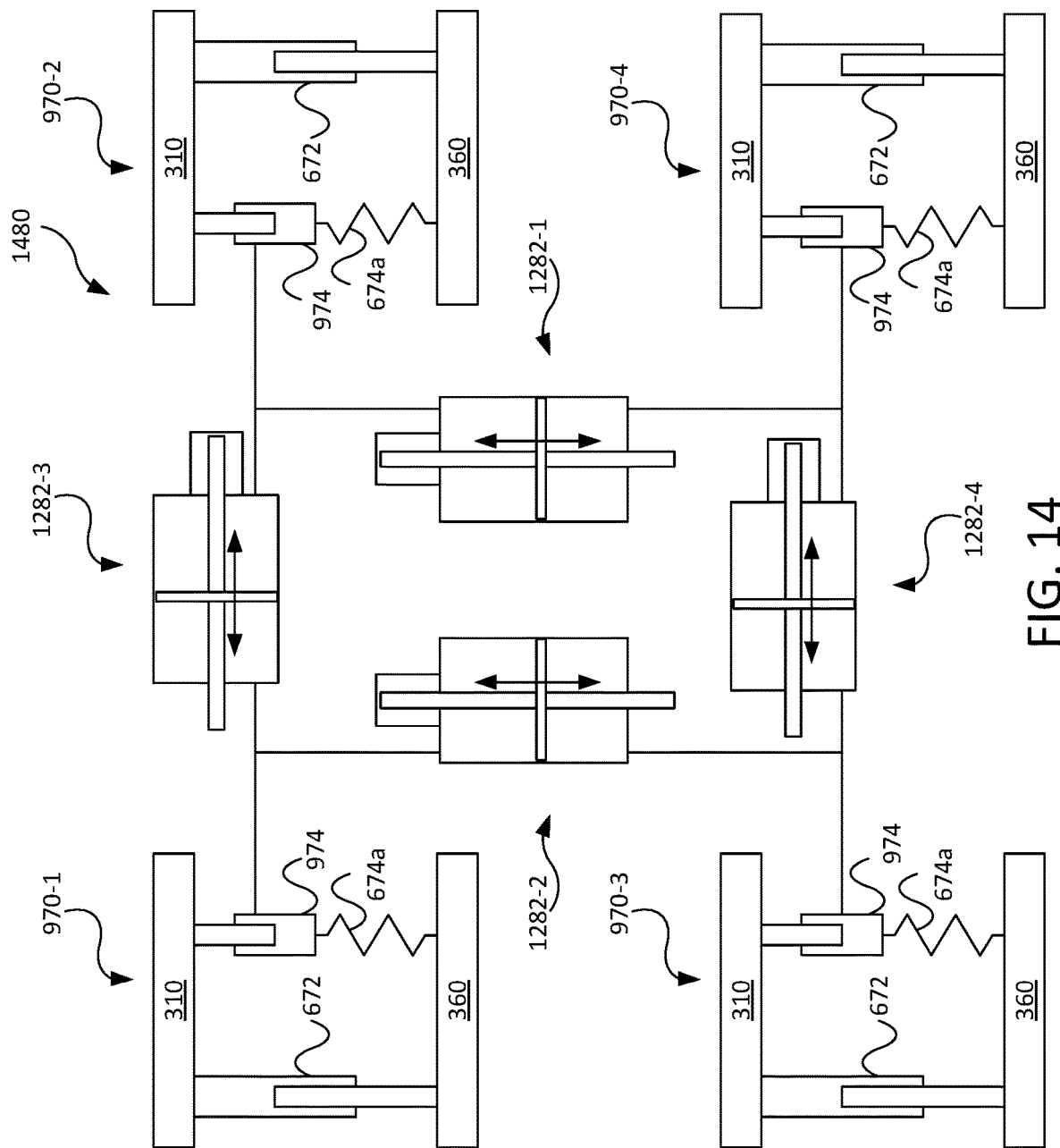
FIG. 14 is a schematic view of another hydraulic circuit including four of the suspension actuators of FIG. 9

Referring to FIG. 14, a hydraulic circuit 1480 is communication with the hydraulic actuator mechanism 974 of four of the suspension actuators 970-1, 970-2, 970-3, 970-4 (e.g., front left, front right, rear left, and rear right). The hydraulic circuit 1480 includes four of the pump units 1282-1, 1282-2, 1282-3, 1282-4 configured as described previously. Each of the pump units 1282 is in communication with the two suspension actuators 970 on each side (i.e., left and right) or each end (i.e., front and rear) of the vehicle 100. As a result, displacement and force transfer can be allocated between each of the four suspension actuators 970 to control roll and pitch of the vehicle 100, as well as warp (e.g., having uneven displacement or force of at least one of the suspension actuators 970 relative to the two suspension actuators 970 adjacent thereto).

The four pump units 1282-1, 1282-2, 1282-3, 1282-4 of the hydraulic circuit 1480 are configured to control front roll, rear roll, left pitch, and rear pitch. As such, a first of the pump units 1282-1 may be considered a front roll pump unit 1282, which is in fluidic communication with and controls the relative displacement and force transfer between the hydraulic actuation mechanisms 974 of the front left and the front right suspension actuators 970-1, 972-2. A second of the pump units 1282 may be considered a rear roll pump unit 1282, which is in fluidic communication with and controls the relative displacement and force transfer between the hydraulic actuation mechanisms 974 of the rear left and the rear right suspension actuators 970-3, 970-4. A third the pump units 1282-3 may be considered a left pitch pump unit 1282, which is in fluidic communication with and controls the relative displacement and force transfer between the hydraulic actuation mechanisms 974 of the front left and the rear left suspension actuators 970-1, 970-3. A fourth of the pump units 1282-4 may be considered a right pitch pump unit 1282, which is in fluidic communication with and controls the relative displacement and force transfer between the hydraulic actuation mechanisms 974 of the front right and the rear right suspension actuators 970-2, 970-4. As compared to having pumps individually associated with each of the actuator mechanism 974, the pump units 1282 may be under no static load, since the loads of the two hydraulic actuator mechanisms 974 associated therewith may be balanced on either side of the piston 1282b. The four pump units 1282-1, 1282-2, 1282-3, 1282-4 may be operated to control roll and pitch as described above with respect to FIG. 12, as well as to control warp.

Figure 15:
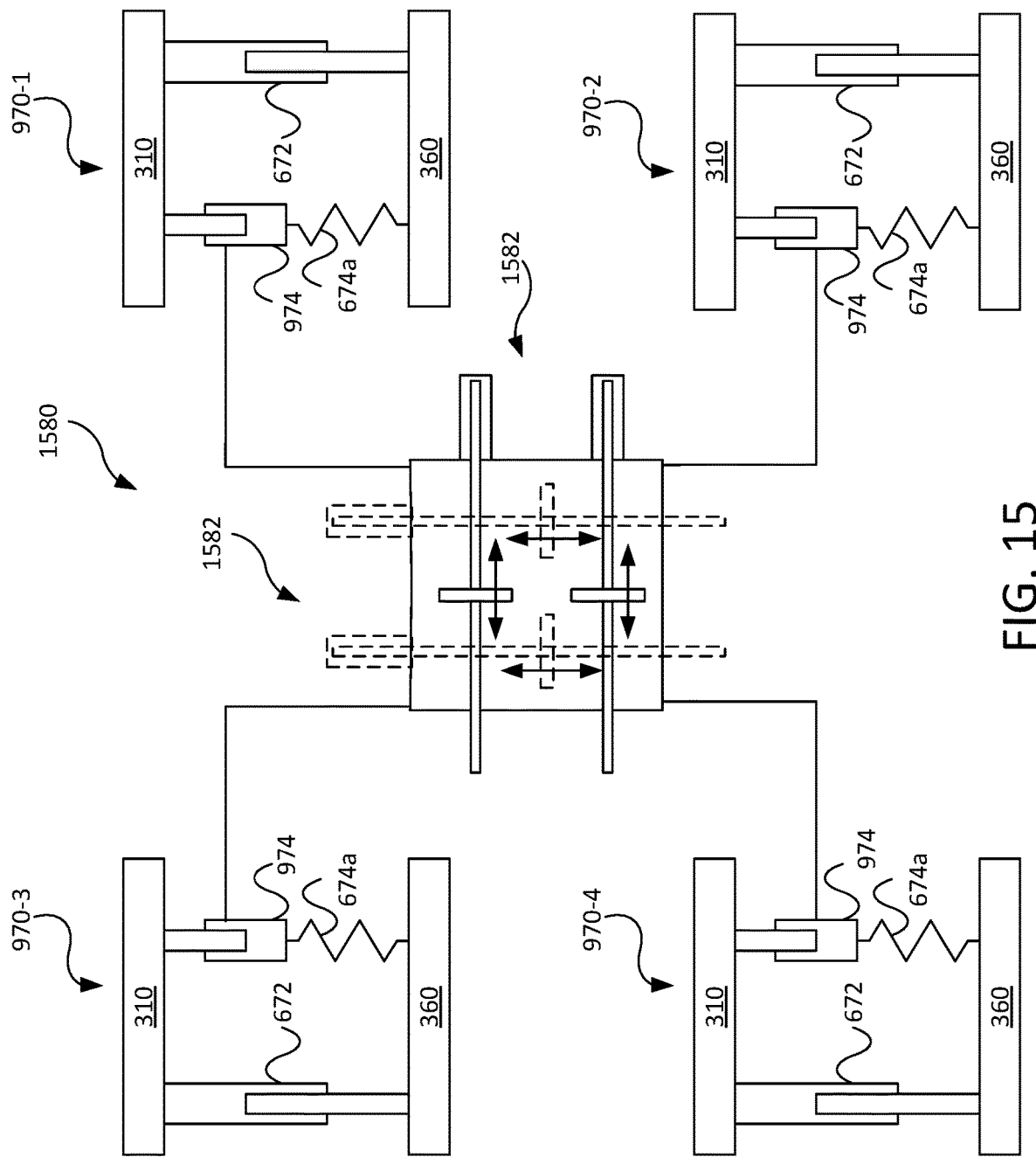
FIG. 15 is a schematic view of another hydraulic circuit including four of the suspension actuators of FIG. 9

Referring to FIG. 15, a hydraulic circuit 1580 is in communication with the hydraulic actuator mechanism 974 of four of the suspension actuators 970-1, 970-2, 970-3, 970-4 (e.g., front left, front right, rear left, and rear right). The hydraulic circuit 1580 further includes fixed volumes of fluid and a pump unit 1582, which performs the functions of four of the pump units 1282 described with respect to the hydraulic circuit 1480. The pump unit 1582 may, for example, include four of the pump units 1282 integrated into a single assembly. The pump unit 1582 may be operated to control roll and pitch as described above with respect to FIG. 11, as well as to control warp.

Figure 16:
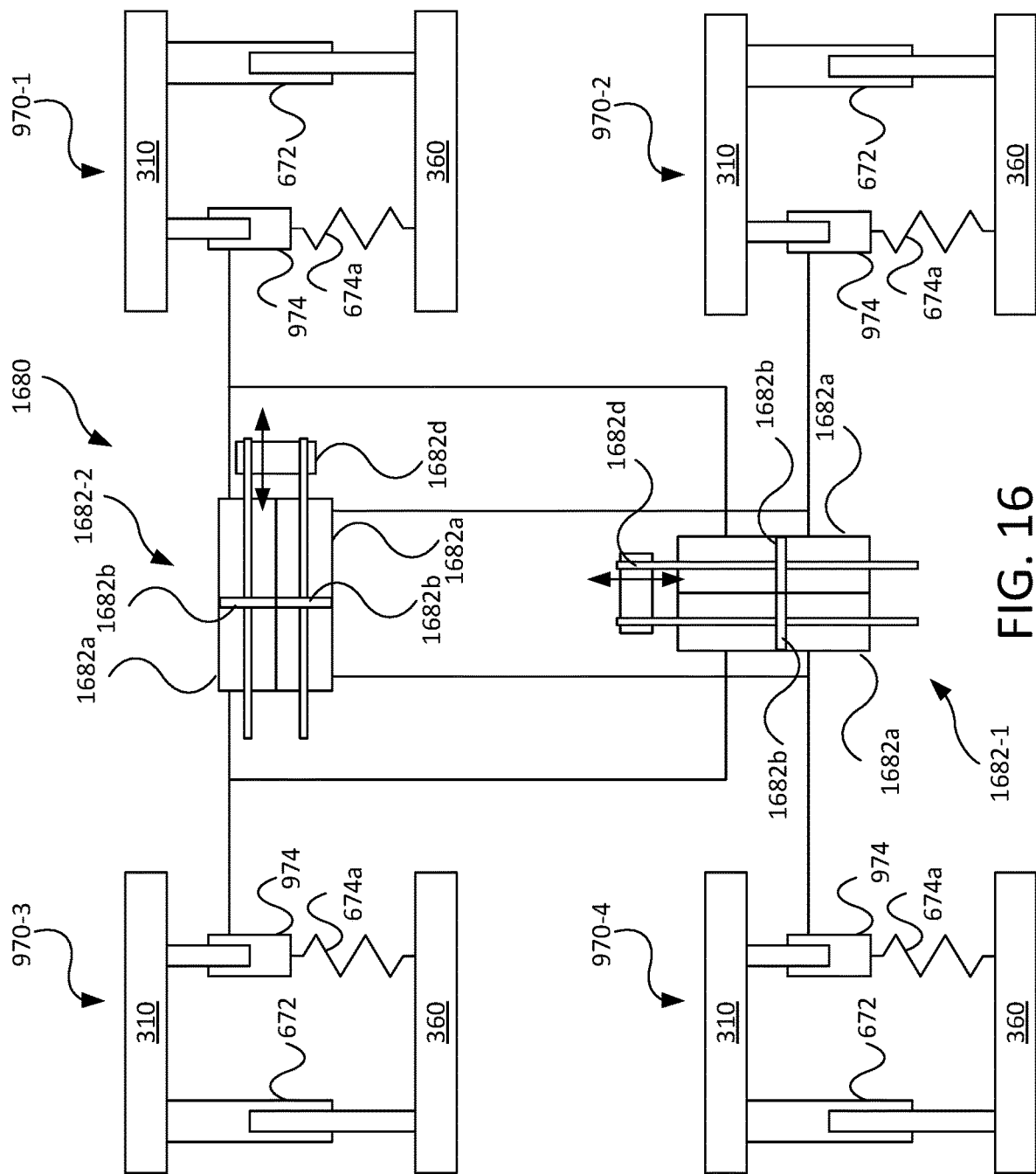
FIG. 16 is a schematic view of another hydraulic circuit including four of the suspension actuators of FIG. 9

Referring to FIG. 16, a hydraulic circuit 1680 is in communication with the hydraulic actuator mechanisms 974 of four of the suspension actuators 970-1, 970-2, 970-3, 970-4 (e.g., front left, front right, rear left, and rear right). The hydraulic circuit 1680 includes fixed volumes of fluid and two pump units 1682-1, 1682-2. Each pump unit 1682 includes two cylinders 1682a and two pistons 1682b that are moved in unison by a common actuator 1682d (e.g., a ball screw actuator), one piston 1682b being movable in and dividing each of the cylinders 1682a into two sides. The two sides of each cylinder 1682a are in fluidic communication with the two hydraulic actuator mechanisms 974 that are either on the same side (right or left) of the vehicle 100 to control pitch or on the same end (front or back) of the vehicle to control roll.

As shown, one of the pump units 1682-1 is configured to control roll of the vehicle 100 and may be considered a roll pump unit 1682. Either side of a first of the cylinders 1682a (e.g., a front roll cylinder) is in fluidic communication with the left and right hydraulic actuator mechanisms 974 of the suspension actuators 970-1, 970-2 at the front of the vehicle 100 to control relative displacement and force transfer between the therebetween. Either side of the other of the cylinders 1682a (e.g., a rear roll cylinder) is in fluidic communication with the left and right hydraulic actuator mechanism 974 of the suspension actuators 970-3, 970-4 at the rear of the vehicle 100 to control relative displacement and force transfer therebetween. The roll pump unit 1682-1 may be operated to control roll of the vehicle 100 in the manner described above with respect to FIG. 12.

The other of the pump units 1682-2 is configured to control pitch of the vehicle 100 and may be considered a pitch pump unit. Either side of a first of the cylinders 1682a (e.g., a left pitch cylinder) is in fluidic communication with the front and rear hydraulic actuator mechanisms 974 of the suspension actuators 970-1, 970-3 on the left side of the vehicle to control relative displacement and force transfer therebetween. Either side of the other of the cylinders 1682a (e.g., a right pitch cylinder) is in fluidic communication with the front and rear hydraulic actuator mechanisms 974 of the suspension actuators 970-2, 970-4 on the right side of the vehicle 100 to control relative displacement and force transfer therebetween. The hydraulic circuit 1680 is not, however, able to control each of the hydraulic actuator mechanisms 974 independently, such that the hydraulic circuit 1680 cannot achieve warp (as described previously). The two pump units 1682 may, instead of being provided as separate units, be provided as a combined unit (e.g., similar to the pump unit 1582 combining four of the pump units 1282). The pitch pump unit 1682-1 may be operated to control pitch of the vehicle 100 in the manner described above with respect to FIG. 12.

Figure 17:
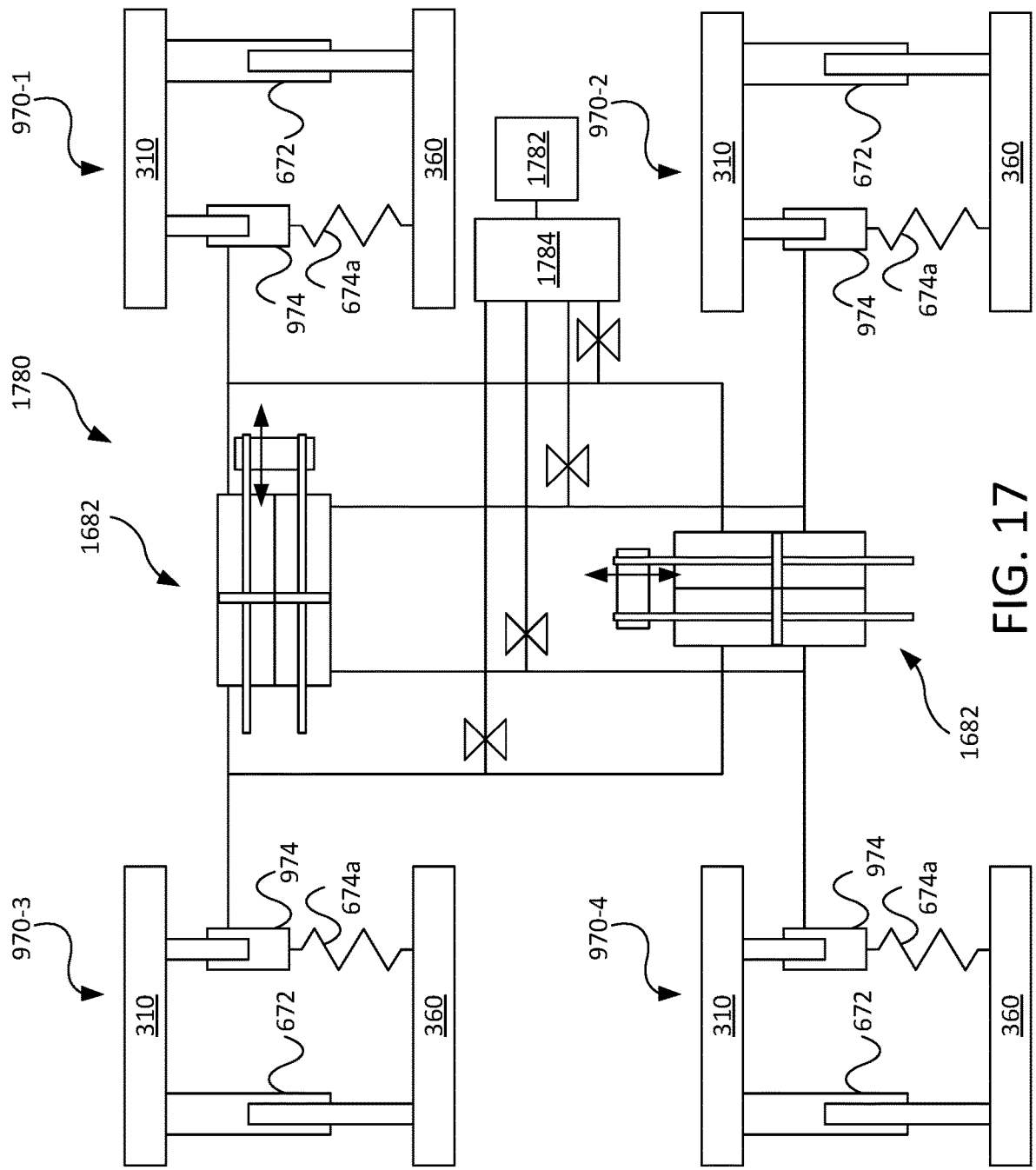
FIG. 17 is a schematic view of another hydraulic circuit including four of the suspension actuators of FIG. 9

Variations of the fluid circuits 1280, 1380, 1480, 1580, and 1680 include, for example, use of constant displacement pumps, variable fluid volumes, valves (e.g., the isolation valve 1084), accumulators (e.g., the accumulator 1086), and stability springs (e.g., the stability spring 1082d). The constant displacement pumps may be used in place of the pump units 1282, 1582, and 1682 having the piston/cylinder arrangement described previously, for example, by being in fluidic communication on opposite sides thereof with the hydraulic actuator mechanisms 974 of the different suspension actuators 970 to control relative displacement and force transfer therebetween. Variable fluid volumes may be provided by a pump and a reservoir, which add to or remove fluid from the various fluid circuit so as to cooperative increase or decrease displacement of the hydraulic actuator mechanisms 974 (e.g., to change the ride height of the vehicle and/or to replenish lost fluid, such as from leakage). The isolation valves 1084 may be in fluidic communication with each of the hydraulic actuator mechanism 974 or each of the respective pump units to provide a zero-energy hold (e.g., by closing the valve to prevent fluid flow thereto. The accumulators 1086 may be in fluidic communication with each of the hydraulic actuator mechanisms 974 the responsiveness of load transfer between linked hydraulic actuator mechanisms 974, and each of the accumulators 1086 may include an isolation valve to increase responsiveness of the load transfer between the linked hydraulic actuator mechanisms 974. The stability springs 1082*d* may be provided on one or both sides of the respective pistons to provide passive stability (e.g., pitch and/or roll stability) in case of failure of the actuators. Referring to FIG. 17, a hydraulic circuit 1780 is a variation of the hydraulic circuit 1680, but additionally includes a fluid source to provides fluid level control. More particularly, the hydraulic circuit 1780 additionally includes a fluid reservoir 1782 and a pump 1784 that are in fluidic communication with each of the hydraulic actuator mechanisms 974 of the suspension actuators 970. Valves (shown; not labeled) may be associated with each of the hydraulic actuator mechanisms 974, which allow independent control of additional fluid to each hydraulic actuator mechanism 974 from the pump 1784. By adding or removing fluid from the hydraulic circuit 1780, the displacement of each of the hydraulic actuator mechanisms 974 may be controlled independently, such that the ride height of the vehicle 100 may be controlled, in addition to roll and pitch in the manners described previously. Similarly, each of the hydraulic circuits 1280, 1380, 1480, 1580 may include the fluid reservoir 1782, the pump 1784, and associated valves by which fluid may be added.

Figure 18:
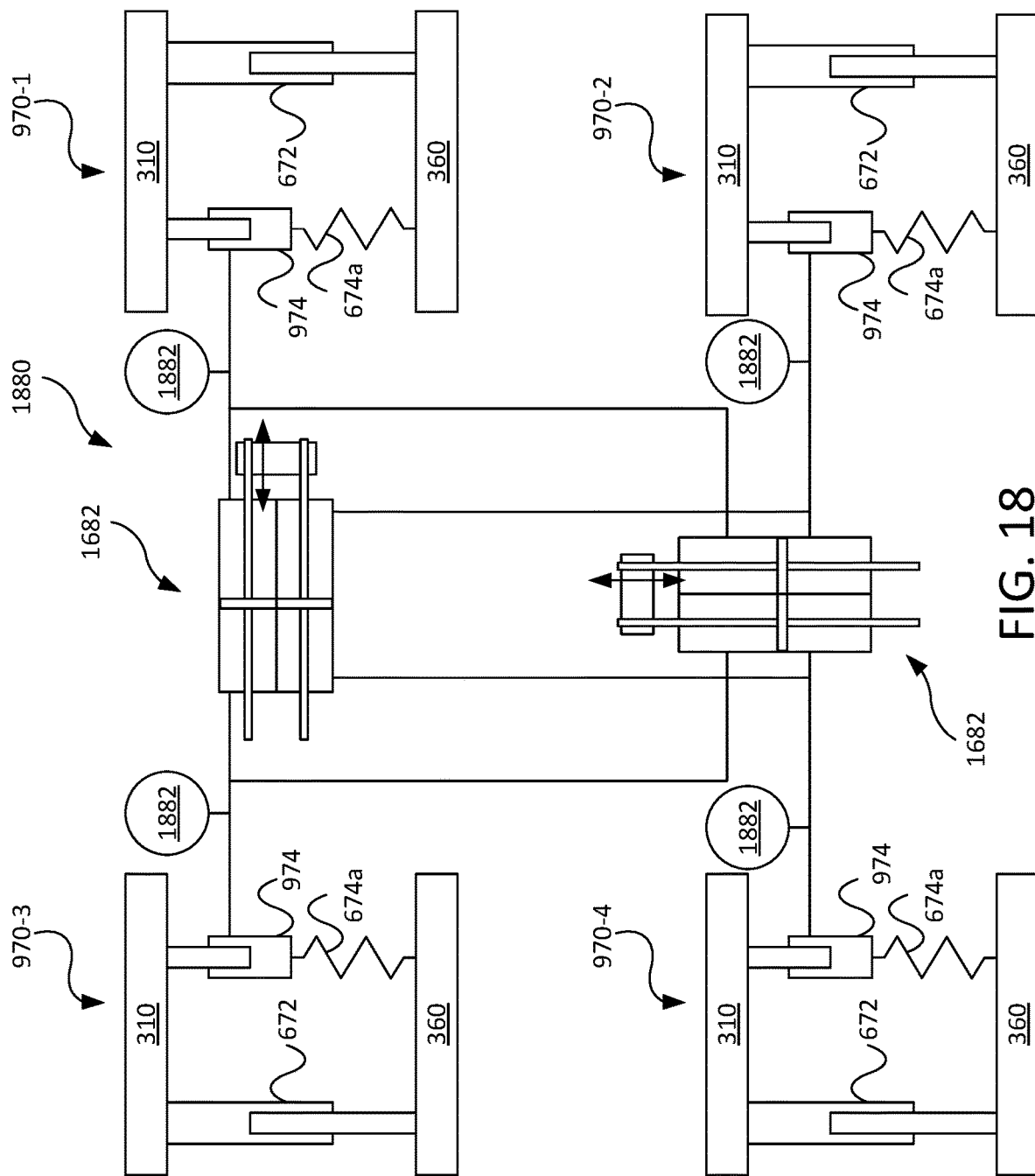
FIG. 18 is a schematic view of another hydraulic circuit including four of the suspension actuators of FIG. 9.

Referring to FIG. 18, a hydraulic circuit 1880 is another variation of the hydraulic circuit 1680, but additionally includes accumulators 1882 that are each in fluidic communication with one of the suspension actuators 970. Each of the accumulators 1882 may additionally include an isolation valve (not shown). The accumulators 1882 provide compliance in the fluid circuit as referenced previously. Similarly, each of the other hydraulic circuits 1280, 1380, 1480, 1580, 1680, 1780 may also include accumulators associated with each of the suspension actuators 970 thereof.

Referring back to FIG. 10, the pump units 1282, 1582, 1682 may each include the stability springs 1082*d*, which function to provide passive force to the respective pistons to pressurize the fluid upon failure or loss of power to the actuators thereof.

What is claimed is:

1. A suspension actuator comprising:
   an upper mount connectable to a sprung mass of a vehicle;
   a lower mount connectable to an unsprung mass of the vehicle;
   a first actuator forming a first load path between the upper mount and the lower mount, wherein the first actuator is a ball screw actuator;
   a second actuator forming a second load path in parallel with the first load path between the upper mount and the lower mount, wherein the second actuator is a hydraulic actuator; and
   a spring arranged in series with the second actuator between the upper mount and the lower mount;
   wherein the ball screw actuator and the hydraulic actuator are coaxial.

2. The suspension actuator according to claim 1, wherein the hydraulic actuator is operated by a pump located remotely from the suspension actuator.

3. The suspension actuator according to claim 1, wherein the second actuator requires less power to hold an output force than the first actuator.

4. The suspension actuator according to claim 1, further comprising a third actuator forming a third load path between the upper mount and the lower mount, the third load path being in parallel to the first load path and the second load path.

5. The suspension actuator according to claim 4, wherein the third actuator is one of a hydraulic actuator or an air spring actuator.

6. The suspension actuator according to claim 1,
   wherein the hydraulic actuator is operated by a pump located remotely from the suspension actuator, the pump operating another hydraulic actuator of another suspension actuator; and
   wherein the hydraulic actuator requires less power to hold an output force than the ball screw actuator.

7. The suspension actuator according to claim 1, wherein the hydraulic actuator surrounds the ball screw actuator.

8. The suspension actuator according to claim 7, wherein the hydraulic actuator includes a chamber that surrounds the ball screw actuator and is filled with a hydraulic fluid.

9. A suspension actuator comprising:
   a first mount for connecting to a sprung mass of a vehicle;
   a second mount for connecting to an unsprung mass of the vehicle; and
   a primary actuator for selectively applying a first force between the first mount and the second mount;
   a spring;
   a second actuator for selectively applying a second force between the first mount and the second mount in parallel to the primary actuator, the second actuator being a hydraulic spring seat arranged in series with the spring for selectively applying the second force between the first mount and the second mount and surrounding the primary actuator;
   wherein the second actuator requires less power to produce an output force than the primary actuator.

10. The suspension actuator according to claim 9, wherein the second actuator has lower bandwidth than the primary actuator.

11. The suspension actuator according to claim 10, wherein the second actuator requires no power to sustain the output force.

12. The suspension actuator according to claim 9, wherein the primary actuator is a ball screw actuator.

13. The suspension actuator according to claim 9, wherein the second actuator includes a chamber that surrounds the primary actuator and is filled with a hydraulic fluid.

14. The suspension actuator according to claim 13, wherein the second actuator includes a piston within the chamber that is pressed by the hydraulic fluid to displace the spring.

15. The suspension actuator according to claim 9, wherein an annular structure is connected to the first mount to move therewith and a shaft is connected to the lower mount to move therewith;
   wherein the primary actuator is connected between the annular structure and the shaft such that the shaft reciprocates linearly within the annular structure;
   wherein the second actuator includes a spring seat and extends around the annular structure.

16. The suspension actuator according to claim 15, wherein the second actuator includes a housing that is fixed relative to the first mount and defines a chamber that surrounds the annular structure, wherein the spring seat is a piston within the chamber.

17. A suspension system for a vehicle comprising:
two suspension actuators, each suspension actuator configured to selectively apply force between a sprung mass of the vehicle and one of two unsprung masses of the vehicle, wherein each of the suspension actuators is associated with one of the unsprung masses and includes:
an upper mount connectable to the sprung mass of the vehicle;
a lower mount connectable to the one of the two unsprung masses associated with the suspension actuator;
a primary actuator forming a first load path by applying force between the upper mount and the lower mount, the primary actuator being a ball screw actuator;
a second actuator forming a second load path in parallel with the first load path between the upper mount and the lower mount, the second actuator being a hydraulic actuator that includes a spring seat; and
a spring arranged in series with the second actuator between the upper mount and the lower mount;
wherein the ball screw actuator and the hydraulic actuator are coaxial; and
a fluid circuit comprising a pump in fluidic communication with the hydraulic actuator of the two of the suspension actuators to control displacement thereof.

18. The suspension system according to claim 17, wherein the fluid circuit transfers force between the hydraulic actuators of the two suspension actuators.

19. The suspension system according to claim 17, wherein the pump cannot cause simultaneous positive displacement of the hydraulic actuators of the two suspension actuators.

20. The suspension system according to claim 17, further comprising two additional ones of the suspension actuators configured to selectively apply force between the sprung mass of the vehicle and one of two additional unsprung masses of the vehicle associated therewith, and a second pump in fluidic communication with the hydraulic actuators of the two additional suspension actuators to control displacement thereof.

21. The suspension system according to claim 20, wherein the pump and the second pump control one of pitch or roll of the vehicle.

22. The suspension system according to claim 20, wherein the pump controls roll of the vehicle, and the second pump controls pitch of the vehicle.

23. The suspension system according to claim 17, wherein the hydraulic actuator displaces an upper end of the spring relative to the upper mount.

24. A suspension actuator comprising:
an upper mount connectable to a sprung mass of a vehicle;
a lower mount connectable to an unsprung mass of the vehicle;
a first actuator forming a first load path between the upper mount and the lower mount, wherein the first actuator is one of an electromagnetic linear actuator or a ball screw actuator;
a second actuator forming a second load path in parallel with the first load path between the upper mount and the lower mount, wherein the second actuator is one of a mechanical linear actuator, an air spring actuator, or a hydraulic actuator;
a spring, wherein the hydraulic actuator acts in series with the spring between the upper mount and the lower mount;
a spring seat that presses against the spring, wherein the hydraulic actuator is configured to move the spring seat axially to apply force via the spring between the upper mount and the lower mount; and
an annular structure connected to the upper mount to move therewith and a shaft connected to the lower mount to move therewith;
wherein the ball screw actuator is connected between the annular structure and the shaft such that the shaft reciprocates linearly within the annular structure;
wherein the hydraulic actuator includes a housing that is fixed relative to the upper mount and defines a chamber that surrounds the annular structure, and the spring seat is a piston within the chamber and extends around the annular structure; and
wherein the second actuator requires less power to hold an output force than the first actuator.

25. The suspension actuator according to claim 24, wherein the housing includes a port through which the hydraulic actuator receives a hydraulic fluid from a fluid source into the chamber to change displacement of the spring seat relative to the upper mount.

* * * * *